(12) United States Patent
Roth et al.

(10) Patent No.: US 6,990,969 B2
(45) Date of Patent: Jan. 31, 2006

(54) AUTOMATIC CHOKE FOR AN ENGINE

(75) Inventors: David Roth, Fond du Lac, WI (US);
James J. Dehn, Brookfield, WI (US);
Thomas G. Guntly, Hartford, WI (US);
Curtis Schultz, Grafton, WI (US);
Hisaya Iwata, Brookfield, WI (US);
Steven R. Schlosser, Fond du Lac, WI (US); Travis Nickels, Milwaukee, WI (US); Gregory D. Irwin, Eagle, WI (US); Kenneth R. Breitenstein, Cedarburg, WI (US); Steven A. Dethloff, Pewaukee, WI (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 23 days.

(21) Appl. No.: 10/784,542

(22) Filed: Feb. 23, 2004

(65) Prior Publication Data
US 2005/0022798 A1    Feb. 3, 2005

Related U.S. Application Data

(60) Provisional application No. 60/491,216, filed on Jul. 30, 2003.

(51) Int. Cl.
*F02D 41/00*    (2006.01)
(52) U.S. Cl. .............. 123/676; 123/437; 261/39.3
(58) Field of Classification Search ................ 123/676, 123/437, 505, 179.16, 179.18
See application file for complete search history.

(56) References Cited

U.S. PATENT DOCUMENTS

| | | | |
|---|---|---|---|
| 1,996,802 A | | 4/1935 | Fitz Gerald |
| 2,086,023 A | | 7/1937 | Fitz Gerald |
| 2,139,355 A | * | 12/1938 | Coffey ...................... 261/39.3 |
| 2,548,334 A | | 4/1951 | Armstrong |
| 3,161,186 A | | 12/1964 | Reichenbach et al. |
| 3,194,224 A | | 7/1965 | Lechtenberg et al. |
| 3,305,223 A | | 2/1967 | Reichenbach |
| 3,315,949 A | | 4/1967 | Sutton |
| 3,319,943 A | | 5/1967 | Morgan |
| 3,789,815 A | | 2/1974 | Schreiner |
| 3,828,745 A | * | 8/1974 | Medrick .................... 261/39.3 |
| 3,834,677 A | * | 9/1974 | Hosho ....................... 261/39.3 |

(Continued)

FOREIGN PATENT DOCUMENTS

EP    1323916    7/2003

(Continued)

OTHER PUBLICATIONS

Briggs & Stratton Company, Service Mannual for Out of Production Engines 1919-1981, published at least as early as 1985, pp. 56,57, and 60.

(Continued)

*Primary Examiner*—Mahmoud Gimie
(74) *Attorney, Agent, or Firm*—Michael Best & Friedrich LLP

(57) ABSTRACT

An automatic choke apparatus for use in an internal combustion engine. The choke apparatus includes a choke valve automatically operable in response to the speed of the engine, a thermally conductive assembly that conducts heat from exhaust gases produced by the engine, a thermally responsive member in thermal communication with the thermally conductive assembly, and a mechanism that moves in response to the thermally responsive member to cause the choke valve to remain in at least a partially open position during engine starting when the thermally responsive member senses a temperature above a predetermined temperature. The thermally conductive assembly at least partially surrounds the path of the exhaust gases.

49 Claims, 22 Drawing Sheets

U.S. PATENT DOCUMENTS

| | | |
|---|---|---|
| 3,863,614 A | 2/1975 | Thompson et al. |
| 3,886,241 A | 5/1975 | Schubeck |
| 3,898,967 A | 8/1975 | Bennett et al. |
| 3,957,026 A | 5/1976 | Winkley et al. |
| 3,970,059 A | 7/1976 | Pisar |
| 4,023,550 A | 5/1977 | Houston |
| 4,031,872 A | 6/1977 | Thompson et al. |
| 4,050,427 A | 9/1977 | Hollins |
| 4,068,636 A | 1/1978 | Nau et al. |
| 4,221,202 A | 9/1980 | Wick |
| 4,297,980 A * | 11/1981 | Bellis .................. 123/438 |
| 4,368,163 A | 1/1983 | Covey, Jr. |
| 4,848,082 A | 7/1989 | Takahashi et al. |
| 5,069,180 A | 12/1991 | Schmidt et al. |
| 5,503,125 A | 4/1996 | Gund |
| 5,511,519 A | 4/1996 | Watson et al. |
| 6,012,420 A | 1/2000 | Dykstra et al. |
| 6,145,487 A | 11/2000 | Dykstra et al. |

FOREIGN PATENT DOCUMENTS

| | | |
|---|---|---|
| JP | 07 158510 | 6/1995 |

OTHER PUBLICATIONS

Briggs & Stratton Company, Illustrated Parts List for Model Series 142300 to 142457, published at least as early as 1965, pp. 3,9,10,14, and 15.

Briggs & Stratton Company, Illustrated Parts List for Model Series 19D, 19D-B, 19D-FB, 19D-R6, and 19D-R6D, published at least as early as 1965, pp. 3,8, and 10.

* cited by examiner

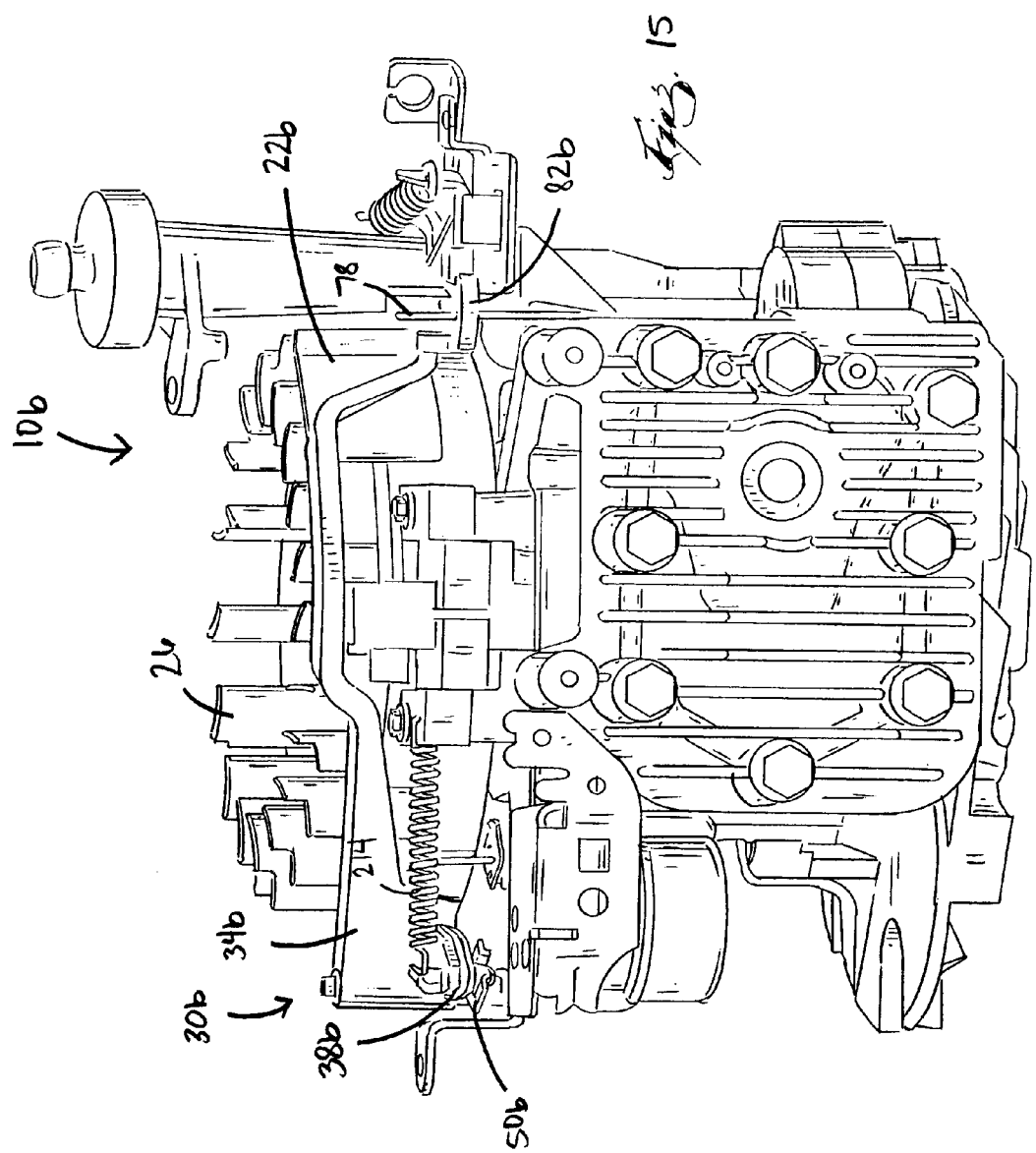

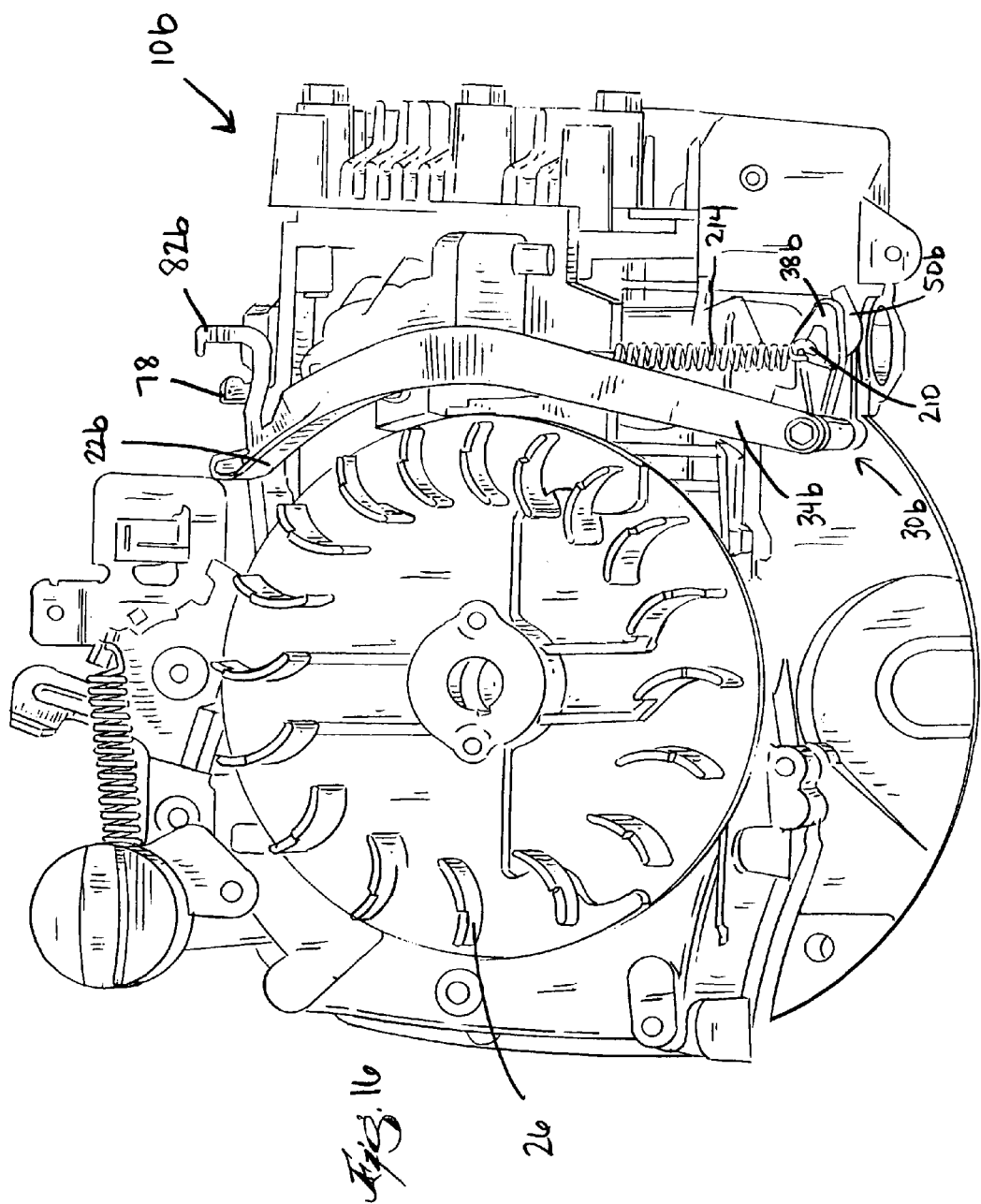

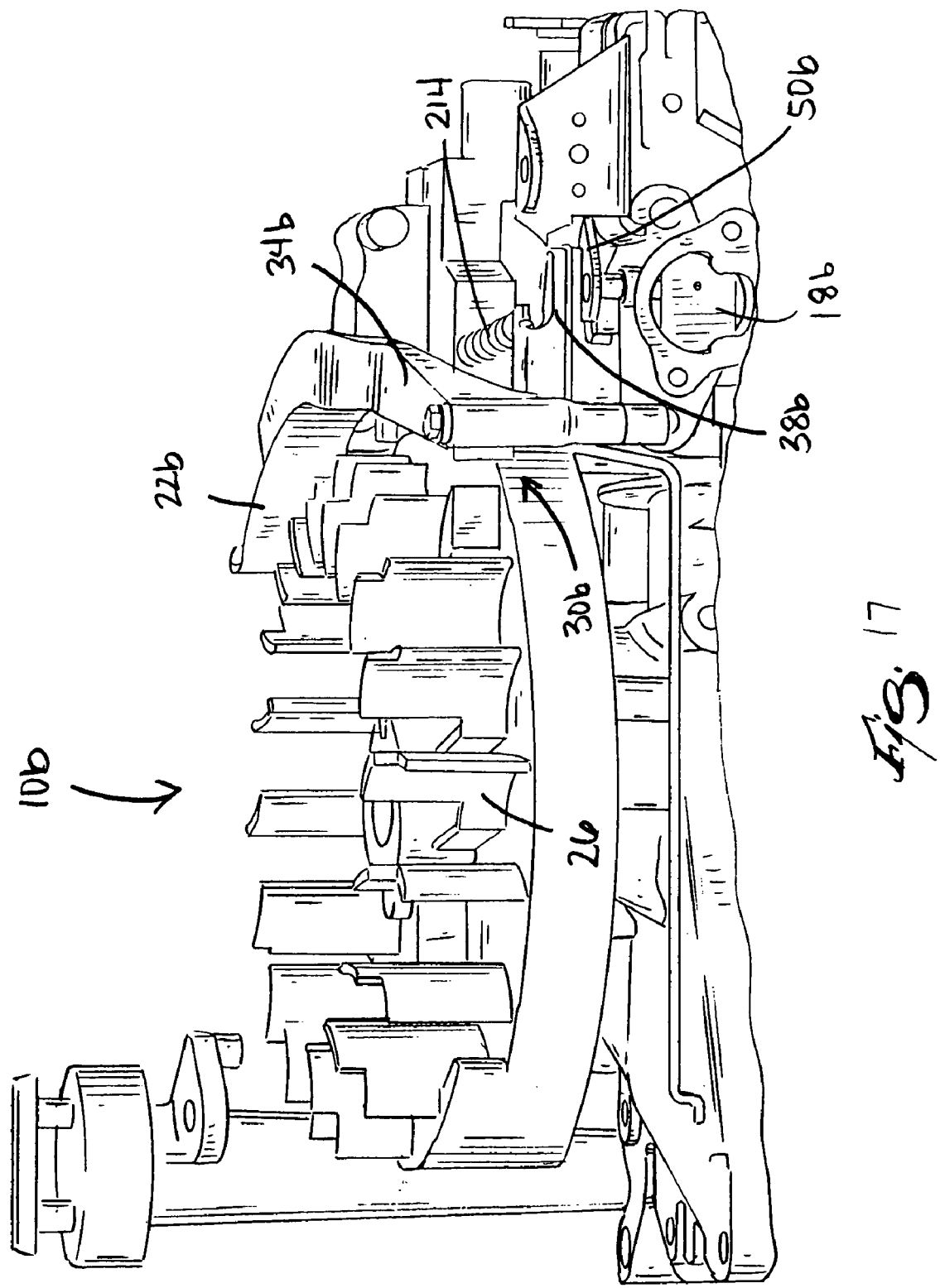

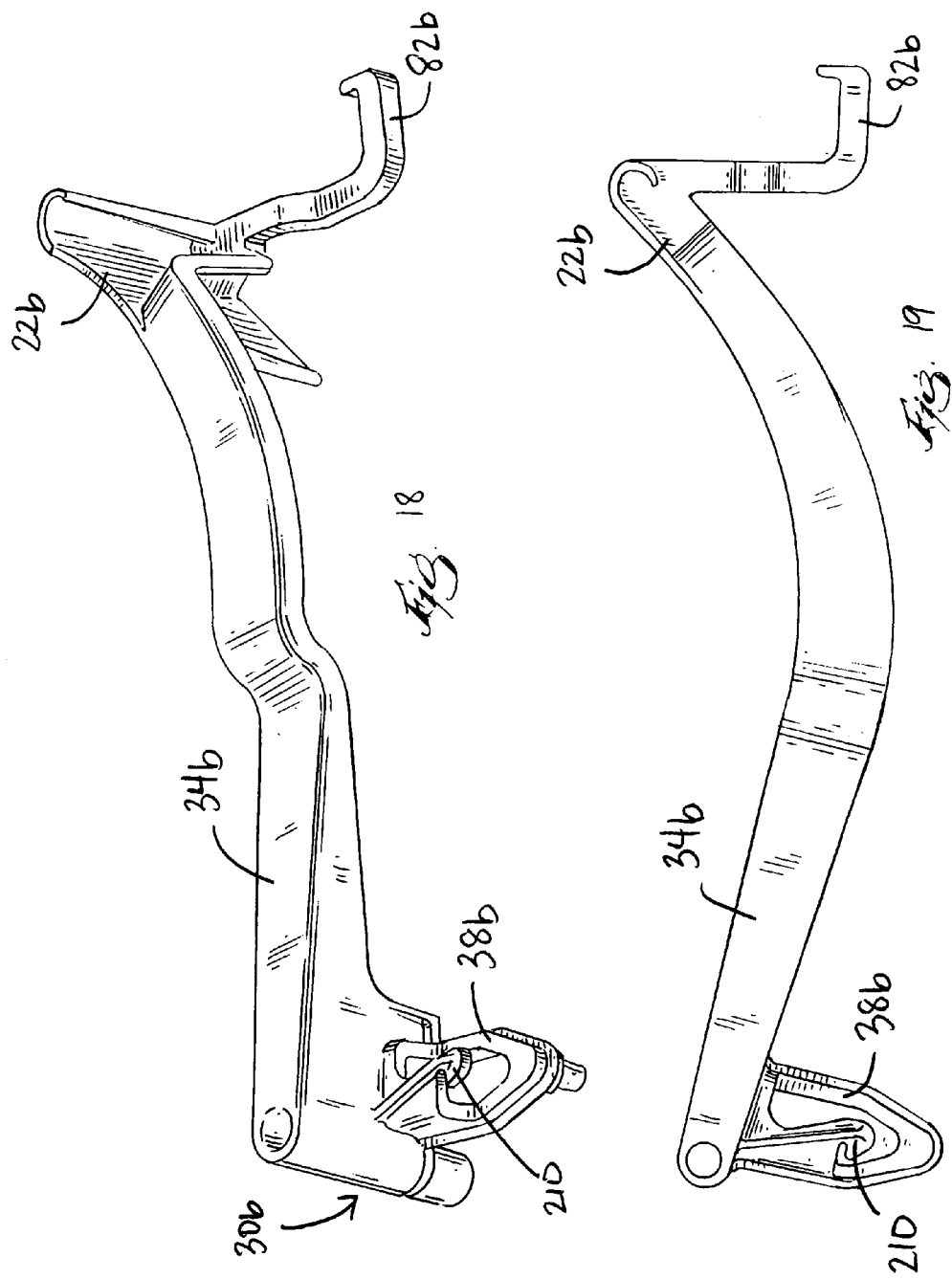

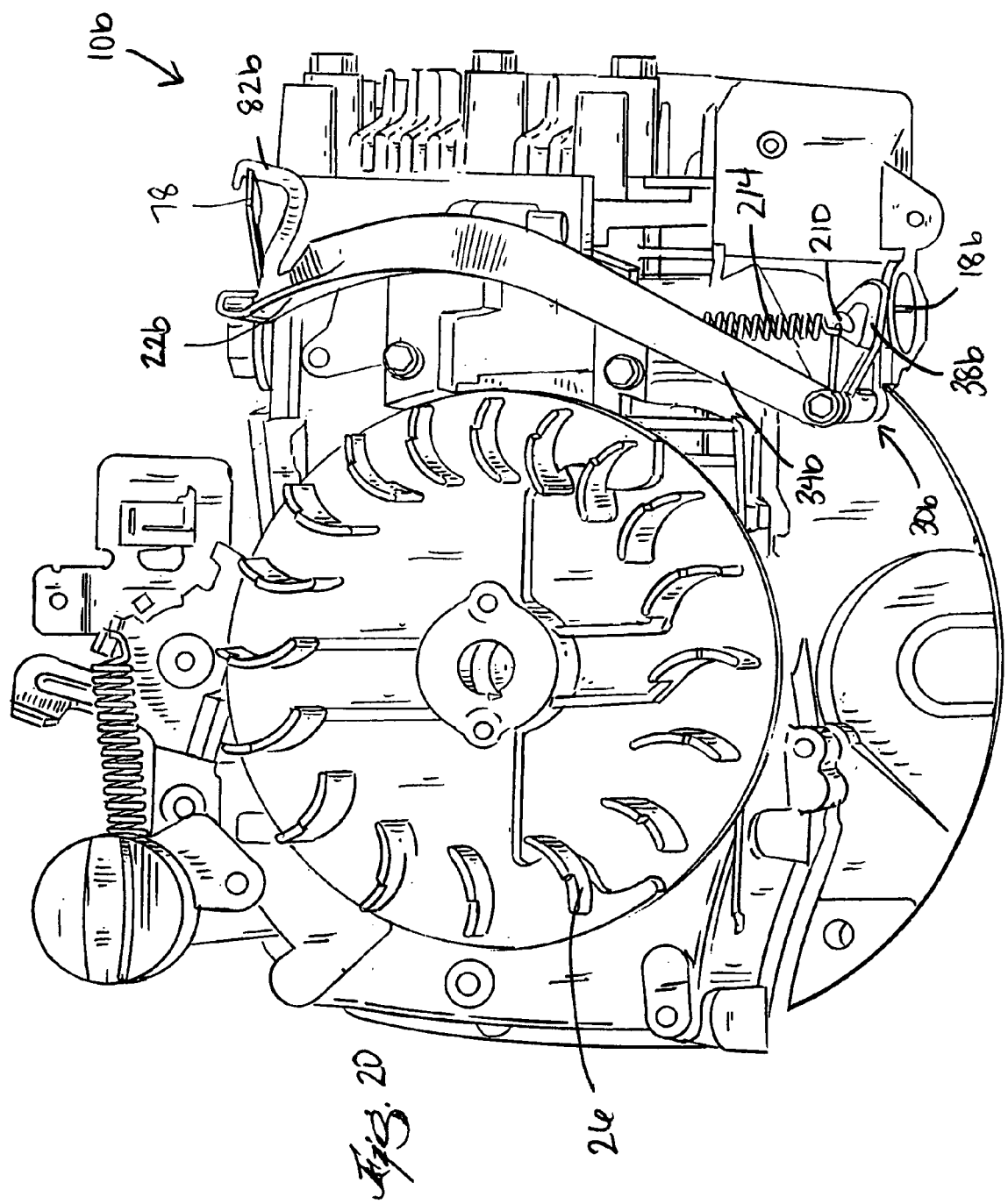

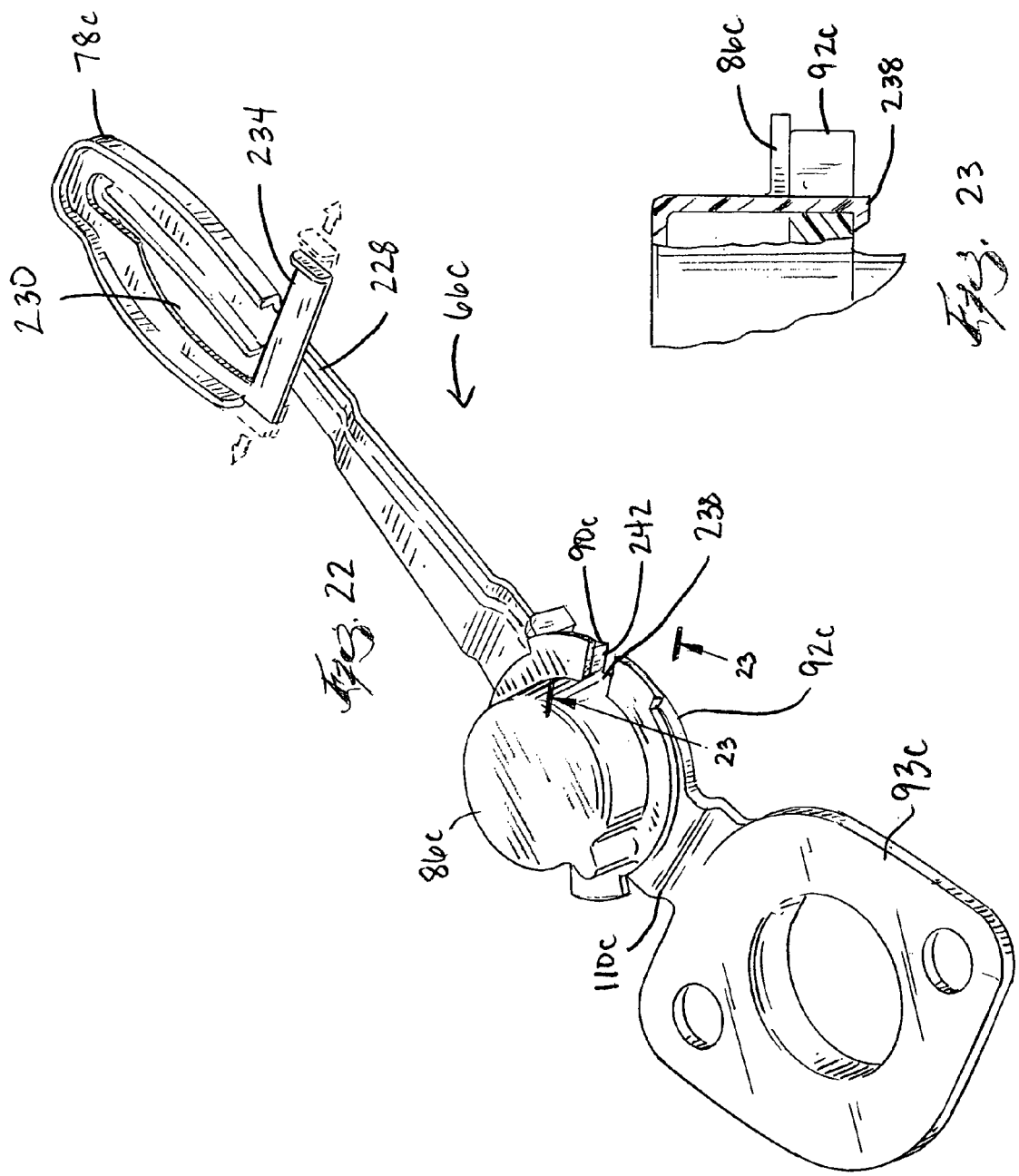

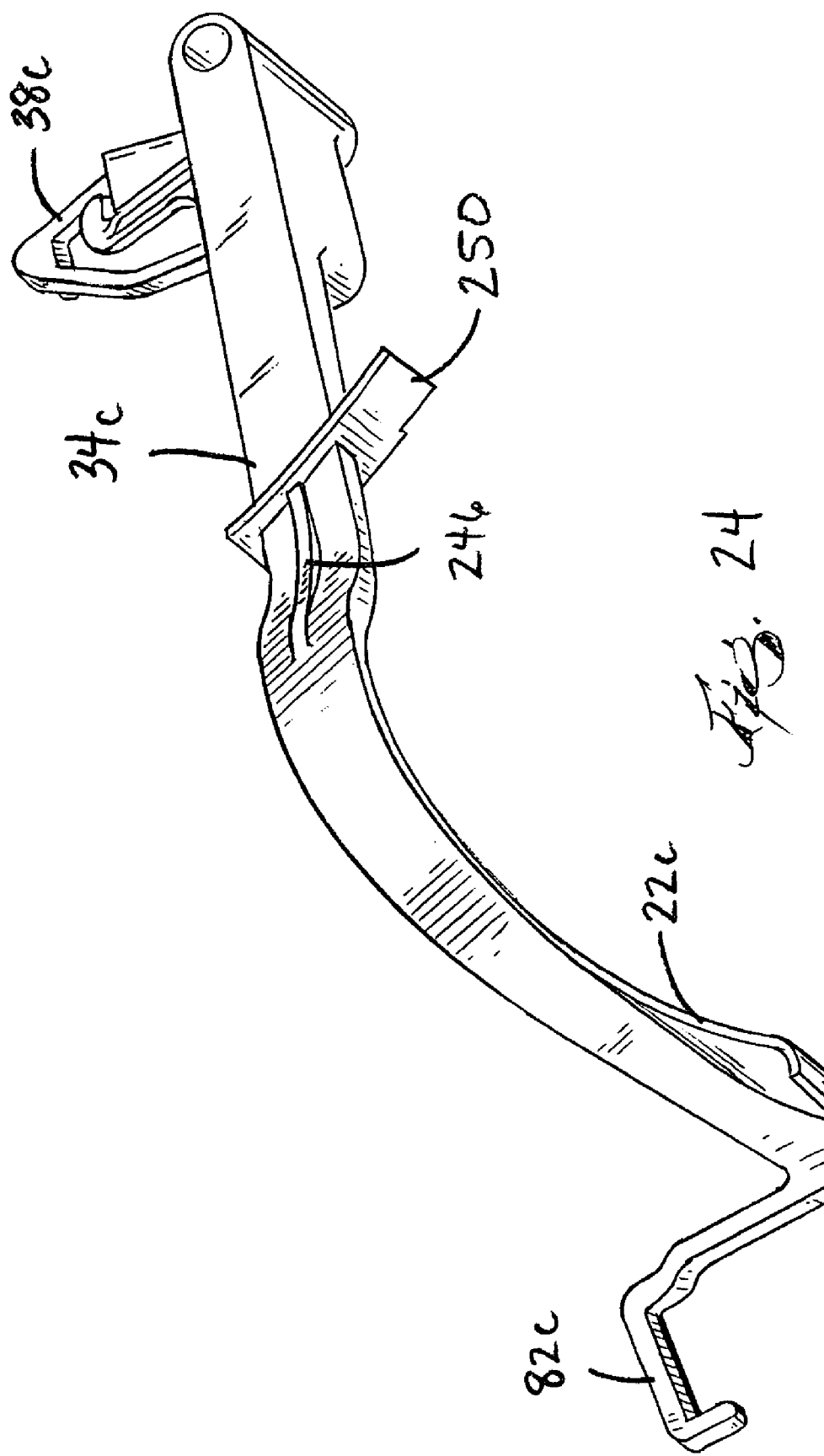

AUTOMATIC CHOKE FOR AN ENGINE

CROSS-REFERENCE TO RELATED APPLICATIONS

This invention claims priority to U.S. Provisional Patent Application No. 60/491,216, filed Jul. 30, 2003, the entire contents of which is incorporated by reference herein.

FIELD OF THE INVENTION

This invention relates to choke assemblies for an internal combustion engine. More specifically, the invention relates to an automatic choke assembly.

BACKGROUND OF THE INVENTION

In small internal combustion engines utilizing a carburetor, such as those engines in a lawnmower or a snowblower, cold temperature starting of the engine requires a more fuel-rich fuel-air mixture in the intake manifold of the engine to sustain the combustion reaction. In some engines, this is done by closing a choke valve, thereby partially choking off the air supply to the engine. As the engine warms up, the choke is no longer necessary because the increased temperatures in the engine help to sustain the combustion reaction and thus the choke is opened, allowing more air into the intake manifold. In many small engines, the choke valve is actuated manually.

Typically during warm engine restarts, the choke must remain open to start the engine and to prevent the engine from stumbling or stalling. During cold starts, if the choke valve is opened too soon, the engine stalls because the fuel-air mixture is not rich enough to sustain the reaction. If the choke remains on too long, the engine may also stumble and excessive hydrocarbon emissions and fouling of the spark plugs can occur.

Prior attempts at designing a small engine with automatic choking capabilities have been relatively unsuccessful, mostly because the designs of those chokes have been complex and thus not practical to manufacture at low cost in large numbers because the tolerances within the engine had to be very closely calculated and adjusted. Every part in the engine adds to tolerance variations that must be accounted for in the engines. The fewer parts in the engine, the easier it is to calibrate for the tolerance variations.

SUMMARY OF THE INVENTION

The present invention provides an automatic choke assembly for an internal combustion engine. One construction of the engine includes a choke valve and a choke operating device that operates the choke valve. The engine also includes a thermally conductive assembly in direct contact with exhaust gases produced by the engine, and a thermally responsive member in thermal communication with the thermally conductive assembly such that the thermally conductive assembly transfers heat from the exhaust gases to the thermally responsive member. The engine also includes a mechanism responsive to the thermally responsive member to cause the choke valve to remain in at least a partially open position during engine starting when the thermally responsive member senses a temperature above a predetermined temperature.

In one embodiment, the choke operating device includes an air vane that moves as a function of the engine speed. In another embodiment, the thermally responsive member is a bimetallic coil. In another embodiment, the thermally conductive assembly at least partially surrounds the path of the exhaust gases. In another embodiment, the mechanism includes a stop lever coupled to the thermally responsive member, the stop lever interacting with the choke operating device.

The present invention also provides a method of operating a choke in an internal combustion engine using exhaust heat including placing a thermally conductive assembly in direct contact with exhaust gases produced by the engine, transmitting heat from the exhaust gases to the thermally conductive assembly through a solid material, and transmitting heat from the thermally conductive assembly to a thermally responsive member in thermal contact with the thermally conductive element. The method also includes providing a linkage between the thermally responsive member and a choke operating device, and preventing the choke valve from closing completely during restarts of the engine when the temperature of the engine has reached a predetermined temperature.

Further constructions and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show some embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

FIG. 15 is a front view of the internal combustion engine of FIG. 14;

FIG. 16 is a top view of the internal combustion engine of FIG. 14;

FIG. 17 is a side view of the internal combustion engine of FIG. 14 showing the choke valve in the closed position;

FIG. 18 is a perspective view of another embodiment of a choke operating device according to the invention;

FIG. 19 is a top view of the choke operating device of FIG. 18;

FIG. 20 is a top view of the internal combustion engine of FIG. 14 with the automatic choke apparatus engaging the choke operating device of FIG. 18;

FIG. 22 is a perspective view of a portion of another embodiment of the automatic choke apparatus of the present invention;

FIG. 23 is a partial section view taken along line 23—23 of FIG. 22; and

FIG. 24 is a perspective view of another embodiment of a choke operating device according to the invention.

DETAILED DESCRIPTION

Figure 1:
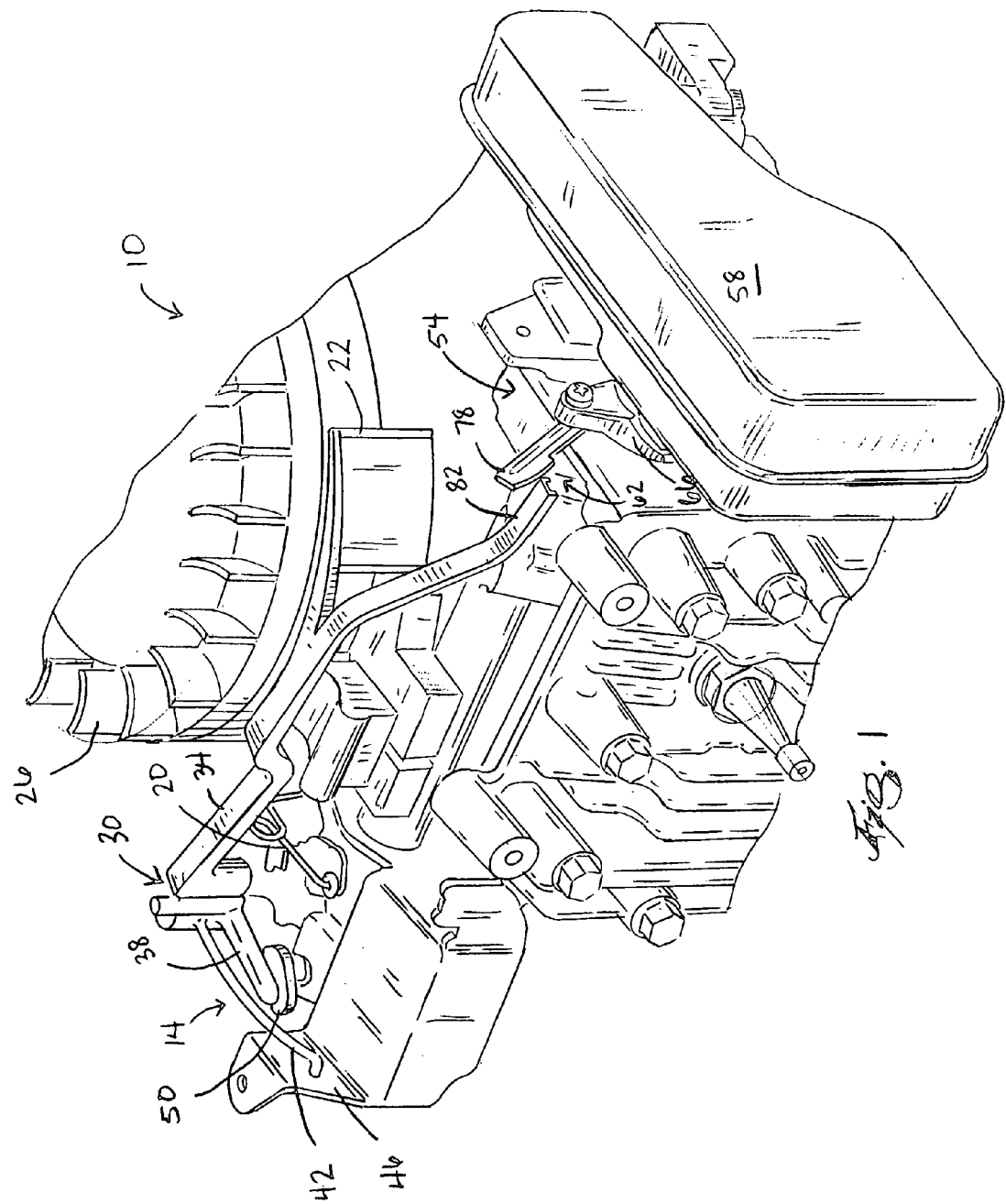
FIG. 1 is a partial perspective view of an internal combustion engine including one embodiment of an automatic choke apparatus embodying the present invention.

FIG. 1 illustrates an internal combustion engine 10 according to one embodiment of the present invention. The engine 10 includes a choke valve assembly 14 that includes a choke valve 18 (shown in FIG. 5) and a choke operating device. The choke operating device may operate the choke valve 18 as a function of the speed of the engine 10. In the illustrated embodiment, the choke operating device is an air vane 22. However, it would be understood by one of skill in the art that other choke operating devices could be used. For example, the choke operating device could include centrifugally mounted flyweights of an engine governor or an engine manifold pressure sensor. The engine 10 also includes a throttle linkage 20.

The air vane 22 moves in response to air flow produced by a fan 26 coupled to the engine crankshaft, and rotates with the crankshaft. In this way, the air vane 22 operates to open and/or close the choke valve as a function of the engine speed. Since the air vane 22 reacts to engine speeds, if the engine attempts to stall, the force on the air vane 22 is reduced as the engine speed drops. As a result, the choke valve 18 begins to close to enrich the fuel-air mix until the engine recovers. The design of the air vane 22 also provides greater torque as the engine speed ramps up after starting, helping to open the choke valve 18 more quickly after start-up, and reducing the exhaust produced by the fuel-rich start-up conditions.

The air vane 22 is connected to the choke valve 18 via a choke linkage 30. The choke linkage 30 includes a first arm 34, a second arm 38, and a biasing member 42. The biasing member 42 is attached to an engine bracket 46 and biases the choke valve 18 to the closed position. The choke linkage 30 also includes a choke lever 50 adapted to operate the choke valve 18. The greater torque of the air vane 22 at low speeds also allows a stronger biasing member 42 to be used to bias the choke valve 18 closed when the engine is cold and helps prevent debris build-up from interfering with the closing of the valve 18.

The engine 10 also includes an automatic choke apparatus 54 and an engine muffler 58 attached to the exhaust manifold (not shown) of the engine 10. The automatic choke apparatus 54 includes a mechanism 62 and a thermally conductive assembly 66. The details of the thermally conductive assembly 66 will be described in detail below with respect to FIG. 2. The mechanism 62 includes a linkage that includes a stop lever 78 coupled to the thermally conductive assembly 66, a tab 82 coupled to the air vane 22, and the choke linkage 30. The function of the linkage will be described in greater detail below.

Figure 2:
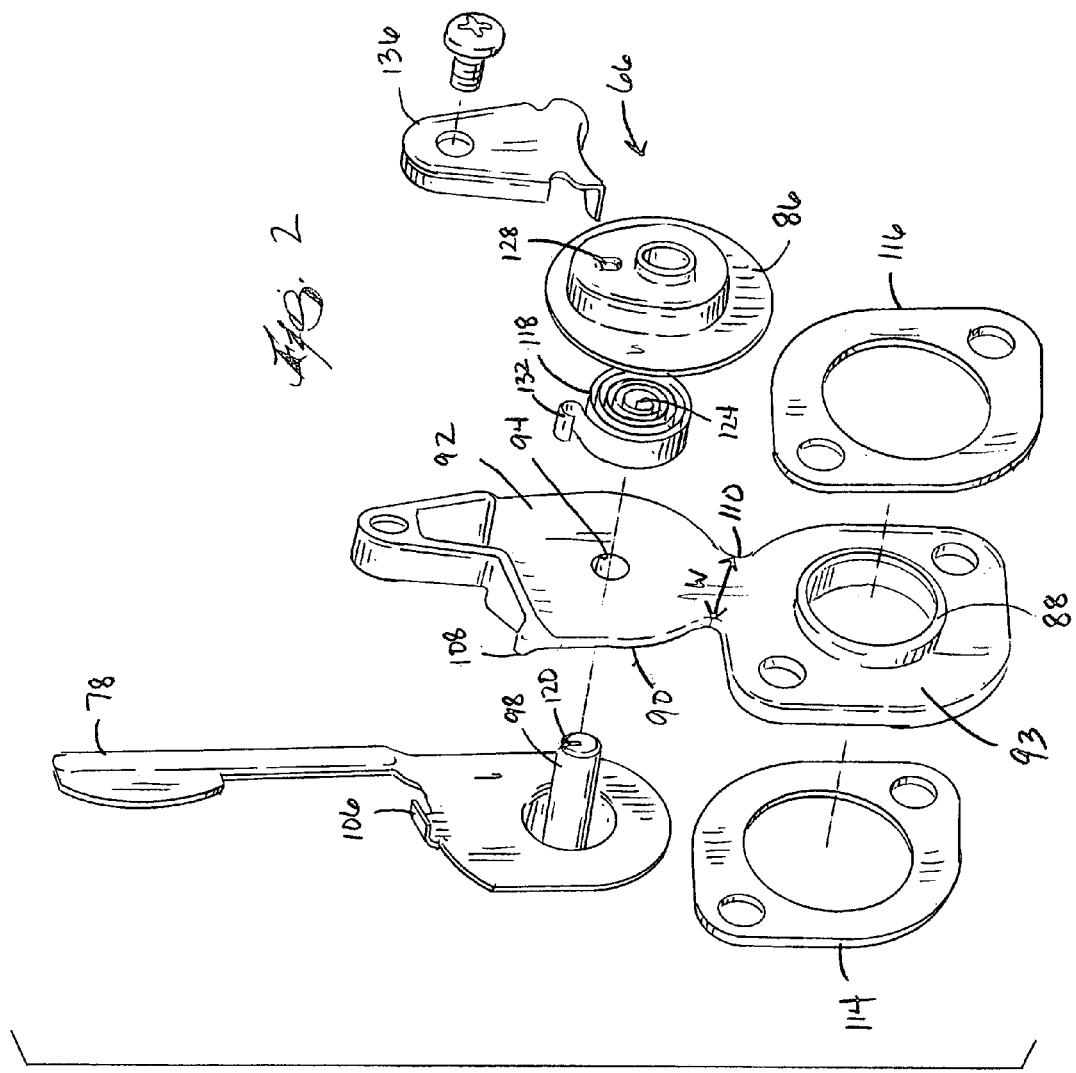
FIG. 2 is an exploded view of a portion of the automatic choke apparatus of FIG. 1.
Figure 3:
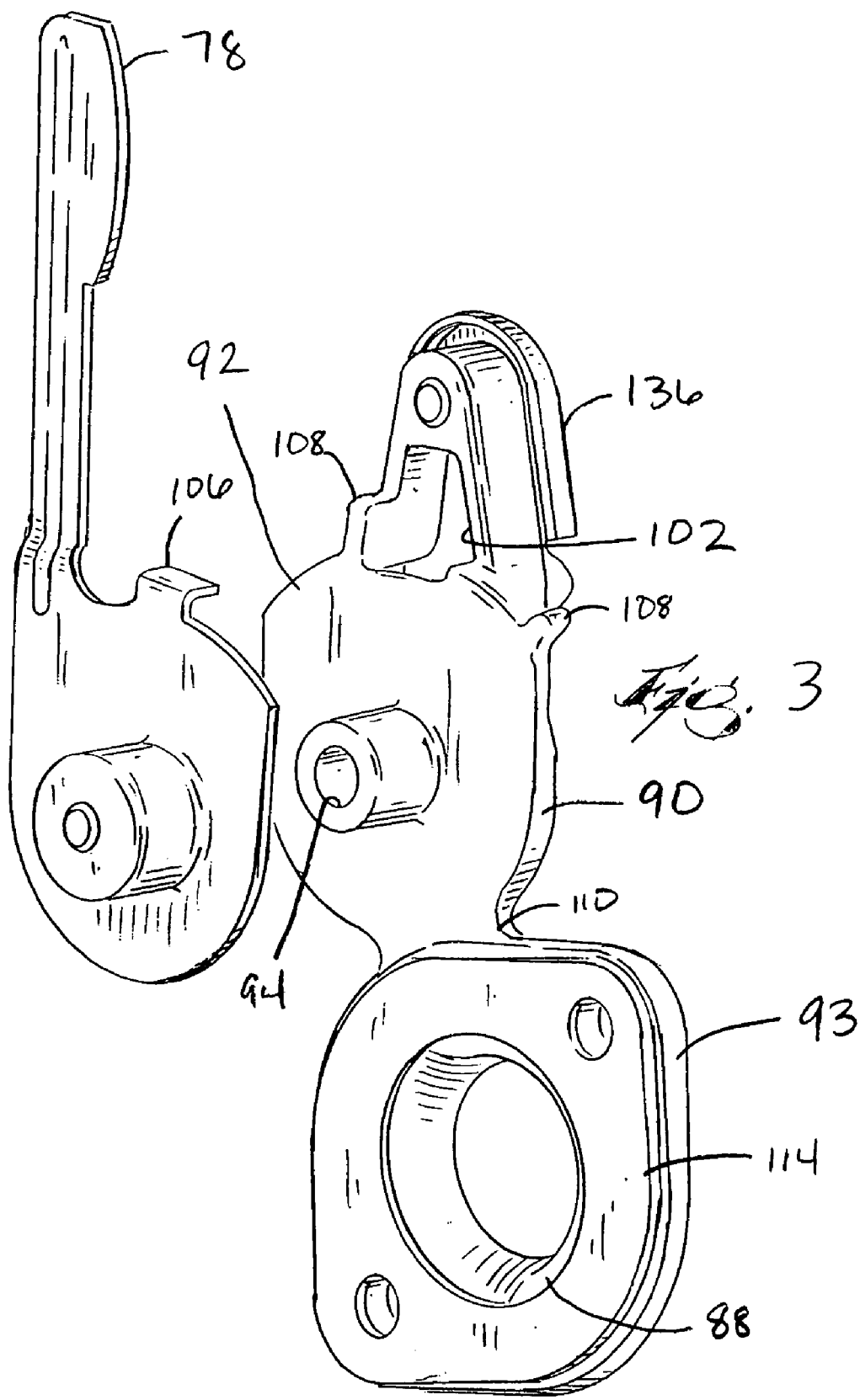
FIG. 3 is a partial exploded rear view of the automatic choke apparatus of FIG. 2.
Figure 4:
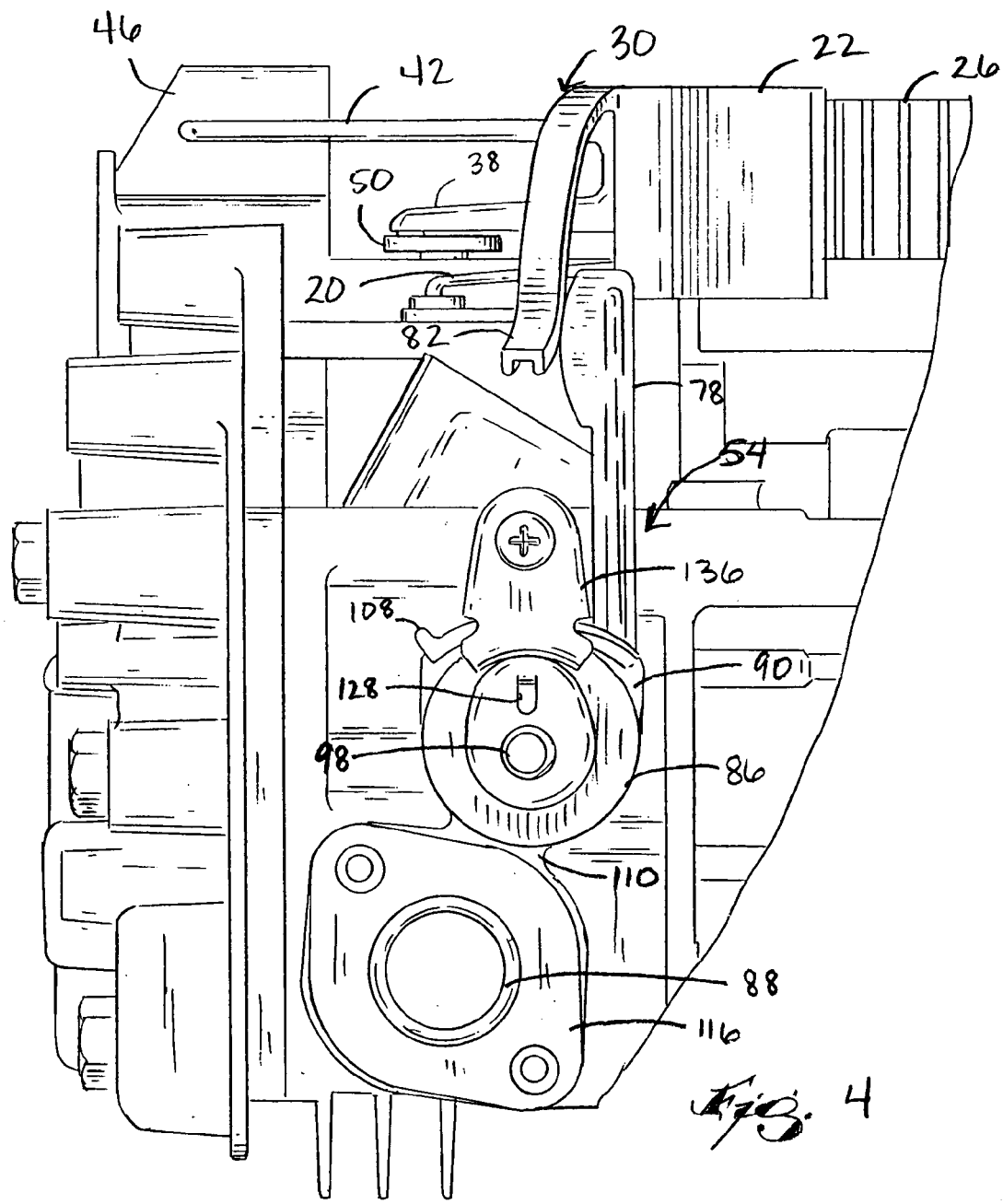
FIG. 4 is a partial side view of the automatic choke apparatus of FIG. 2 coupled to the engine.

Referring now to FIGS. 2 and 3, the thermally conductive assembly 66 includes a cover 86 located adjacent the muffler 58. The cover 86 may be formed of any appropriate material, such as aluminized steel, brass, ceramic material, or nylon, and in some embodiments can include a conductive material. The thermally conductive assembly 66 includes a conductive element 90 that is coupled to the engine housing. The conductive element 90 may be formed of stamped metal, such as an aluminum alloy. In the illustrated embodiment, the conductive element 90 is formed of a standard 380 die cast aluminum alloy.

The conductive element 90 also includes an exhaust flange 88 adapted to cooperate with the output of the exhaust manifold and/or muffler 58 of the engine 10. Thus, the thermally conductive assembly 66 at least partially surrounds the direct path of the exhaust gases from the engine, thereby placing the thermally conductive assembly 66 in direct contact with the exhaust gases. This placement in direct contact with the gases allows for near instantaneous response of the automatic choke apparatus 54 in response to engine temperature to keep the choke valve 18 at least partially open during warm restarts. In embodiments where a muffler is not utilized, the thermally conductive assembly 66 at least partially surrounds the exhaust manifold of the engine.

The conductive element 90 further includes a first portion 92 and a second portion 93. The exhaust flange 88 is connected to the second portion 93 of the conductive element 90. The conductive element 90 also includes a bridge 110 extending between the first and second portions 92, 93. As illustrated in FIG. 2, the bridge 110 has a width W that is preferably less than the width of either the first or second portions 92, 93 of the conductive element First and second gaskets 114, 116 are coupled to either side of the exhaust flange 88 to ensure a secure fit between the conductive element 90 and the exhaust manifold and to reduce vibrations in the conductive element 90.

Considerations of the volume and shape of the thermally conductive assembly 66 are important to obtain the most efficient heat transfer through the thermally conductive assembly. Both increased surface area and increased mass contribute to heat loss in the thermally conductive assembly 66, and thus less heat transferred. Thus, the conductive element 90 (including the widths of the first portion 92, second portion 93, and bridge 110), cover 86, and exhaust flange 88 are selected such that the amount of surface area, the shape, the mass, and the conductive material together achieve the desired amount of heat transfer from the exhaust gases to the thermally conductive assembly 66.

The physical shape, mass, and materials of the thermally conductive assembly 66 are also optimized to create an ideal thermal conducting geometry to transfer heat through the thermally conductive assembly 66 to be proportional to the engine temperatures during starting, warm-up, and cool down. The geometry of the thermally conductive assembly 66 allows for rapid temperature rise and calibrated cool down to address the engine fueling requirements (or, the choking requirements).

Figure 13:
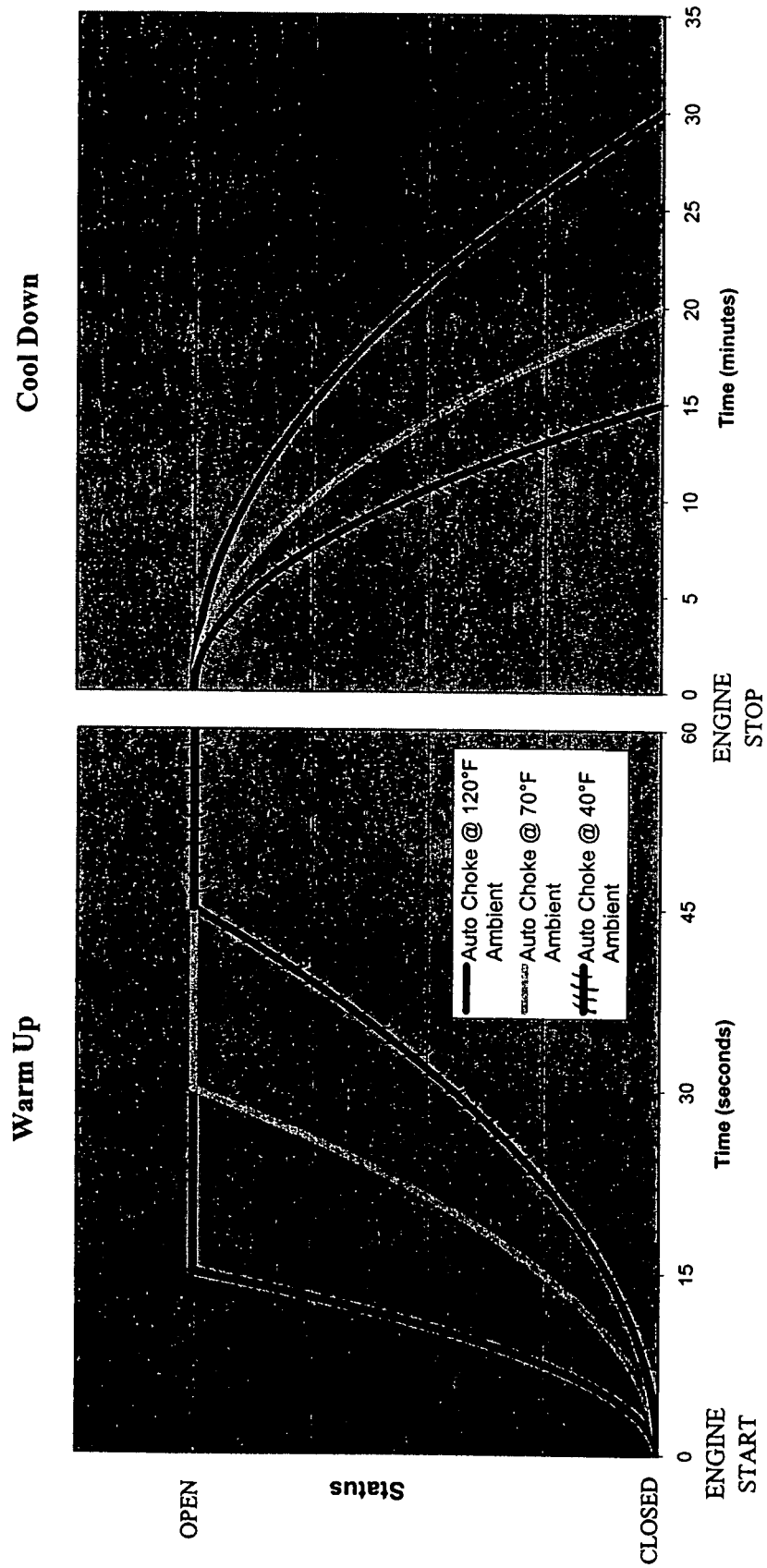
FIG. 13 is a graphic representation of the time vs. temperature curves generated by an engine utilizing the automatic choke apparatus of the illustrated invention.
Figure 14:
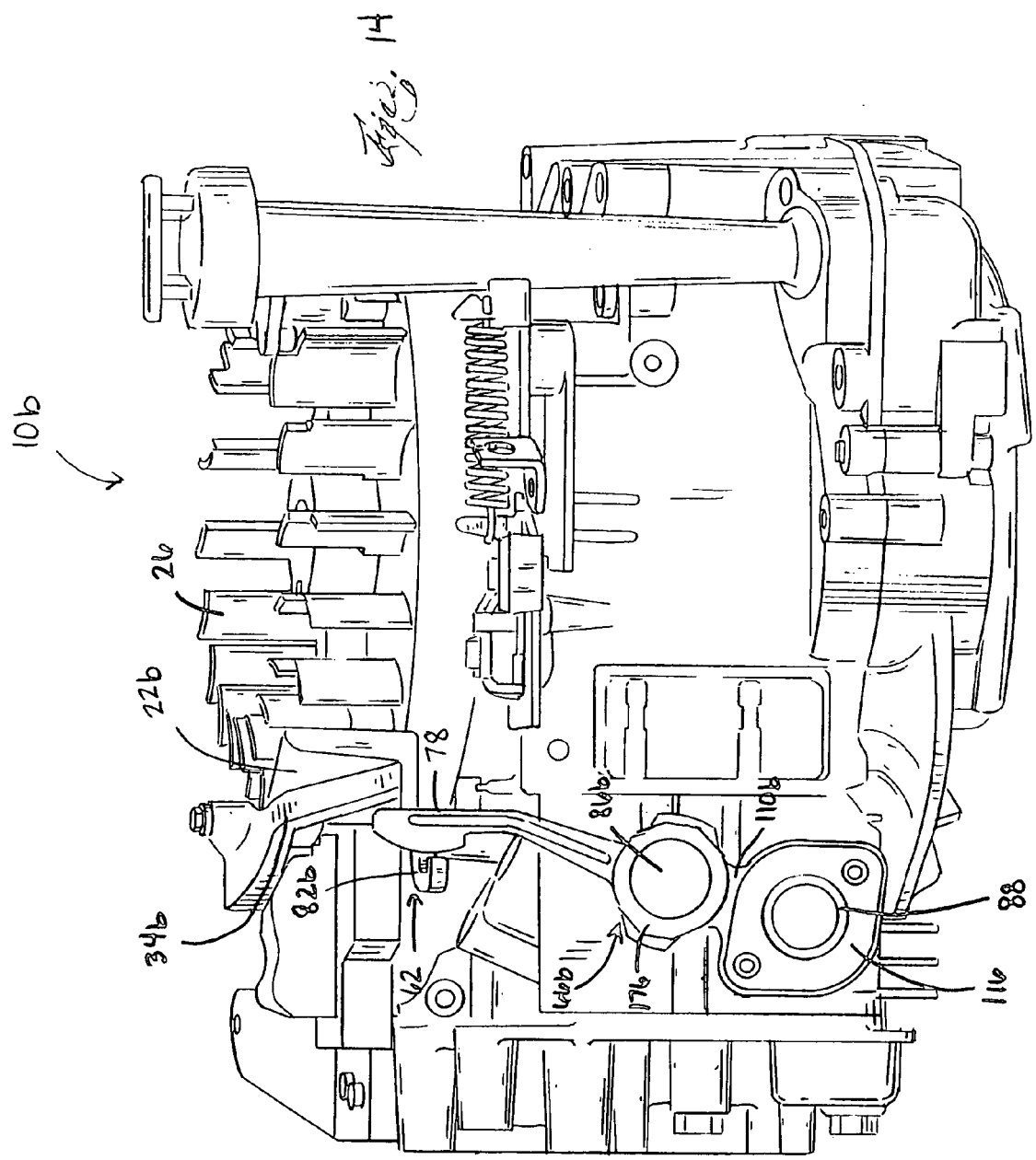
FIG. 14 is a side view of an internal combustion engine including the automatic choke apparatus of FIG. 9.

The physical configuration of the thermally conductive assembly 66 is not only important to help provide near instantaneous response of the automatic choke apparatus 54, it is also important to allow the choke valve 18 to close after an appropriate cool down period. Thus, the thermally conductive assembly 66 is configured not only for efficient heat conduction, but also for appropriately calibrated heat loss. FIG. 13 illustrates the desired time vs. temperature rise curves for an engine utilizing the automatic choke apparatus 54 described herein.

The conductive element 90 includes a first aperture 94 that is configured to receive a mounting pin 98 that is coupled to the stop lever 78. The conductive element 90 also includes a second aperture 102 (best seen in FIG. 3) configured to receive a stop projection 106 that is coupled to the stop lever 78. The conductive element 90 also includes two stop tabs 108 that interact with the stop projection 106 to prevent the stop lever 78 from over-rotating in response to changes in the thermally conductive assembly 66.

The thermally conductive assembly 66 also includes a thermally responsive member coupled to the conductive element 90. In the illustrated embodiment, the thermally responsive member is a bimetallic coil 118. However, it is understood that in other embodiments, the thermally responsive member may be any appropriate thermal actuator, such as a wax motor, a thermally responsive wire, a bimetallic disk, plastics, etc. The placement of the thermally responsive device within the engine dictates which type of thermally responsive member is appropriate as conditions vary within the engine 10. Exhaust temperatures rise throughout engine use to very high levels (upward of 500 degrees Fahrenheit) and thus the thermally responsive member must be able to withstand extreme temperatures for long periods of time. Bimetallic coils can withstand the sustained high temperatures while providing quick (i.e., the coil is reactive to temperature changes) and accurate temperature measurement for actuating the choke. The bimetallic coil 118 may be formed of several known combinations of two metals having different coefficients of thermal expansion or contraction such that the bimetallic coil 118 either expands or contracts in response to the temperature changes in the engine 10.

The bimetallic coil 118 is coupled between the cover 86 and the conductive element 90. A slot 120 in the mounting pin 98 grips the inner end 124 of the coil 118. A coil aperture 128 in the cover 86 receives a coil tab 132 to secure the coil 118. A clamp 136 is also coupled to the conductive element 90 to further anchor the cover 86 and the coil 118 to the thermally conductive assembly 66.

The above described apparatus acts to automatically operate the choke valve 18 based upon the temperature of the engine 10. The bimetallic coil 118 acts as a thermostat in the engine 10 that assures that the choke valve 18 remains at least partially open when the engine 10 reaches a predetermined temperature to maximize fuel efficiency and starting performance in the engine 10. If you start the engine 10 when it is cold, the engine temperature needs to reach approximately one hundred eighty degrees to open the choke valve 18. The amount of time it takes for the engine to reach one hundred eighty degrees will depend on the ambient temperature of the engine before starting. Thus, the automatic choke apparatus 54 is self-adjusting to any particular use.

As the engine 10 produces exhaust gases, heat from those gases is conducted by the thermally conductive assembly 66 through a solid material, i.e., the exhaust flange 88, and transmitted to the coil 118 through thermal contact with the coil 118. As used herein, the word "solid" is defined to mean an object that is not a fluid or a gas. Thus, the heat from the exhaust gases is conducted through the molecules of a solid material, as opposed to through a gas or liquid. The solid material is the conductor of the heat.

The increased temperature in the coil 118 causes the coil to expand or contract, resulting in rotation of the mounting pin 98 and the stop lever 78. The stop lever 78 interacts directly with the tab 82 coupled to the air vane 22, holding the air vane 22 away from the fan 26. This interaction actuates the choke linkage 30 to open the choke valve 18. Before the engine heats up, a gap (i.e., a pocket of air) exists between the stop lever 78 and the tab 82. The direct interaction between the stop lever 78 and the tab 82 (as opposed to a linkage between the stop lever 78 and the tab 82) results in a gap tolerance that is not very sensitive. A gap in the range between one-sixteenth of an inch and one-half of an inch will allow for proper functioning of the automatic choke apparatus 54. Thus, the position of the stop lever 78 need not be precisely gauged during manufacturing and can be simply adjusted by adjusting the clamp 136.

When the engine 10 is turned off, the biasing member 42 tends to bias the choke valve 18 closed so that when the engine 10 is started again, the fuel-air mixture is rich enough to sustain the combustion reaction. However, if the engine 10 is started when the temperature is above the predetermined level (i.e. the one hundred eighty degree mark), the coil 118 prevents the choke valve 18 from completely closing by causing the stop lever 78 to engage the tab 82 and choke linkage 30 to hold the choke valve 18 in at least a partially open position. As a result, the engine will start when it is hot and should not stumble or stall due to an overly-rich fuel-air mixture while the engine speed is increasing to operating speeds.

FIGS. 5–8 illustrate another embodiment of the automatic choke apparatus of the present invention. Similar parts have been given the reference numeral "a" when appropriate.

Figure 5:
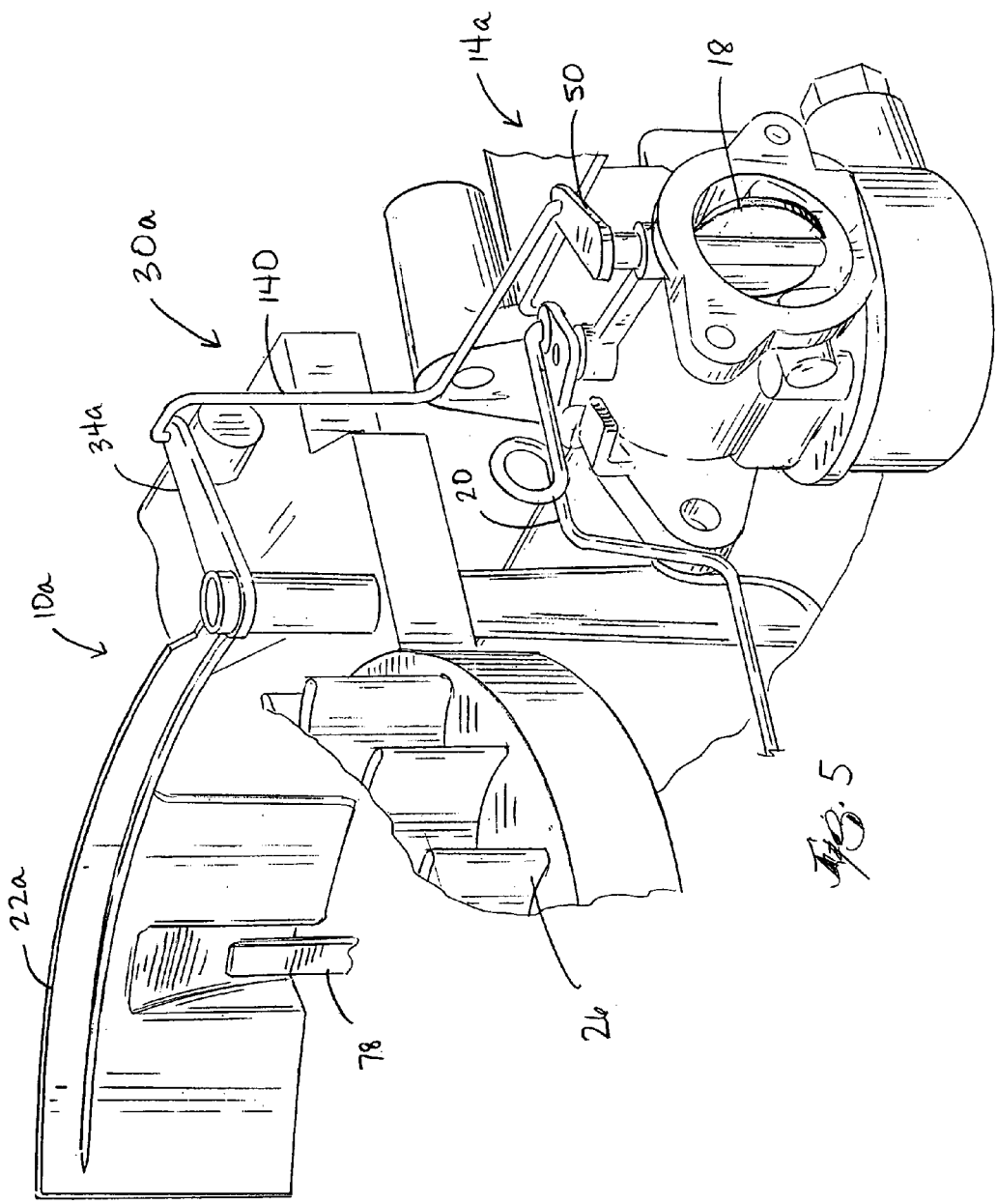
FIG. 5 is a partial perspective view of a choke valve assembly of the present invention.
Figure 6:
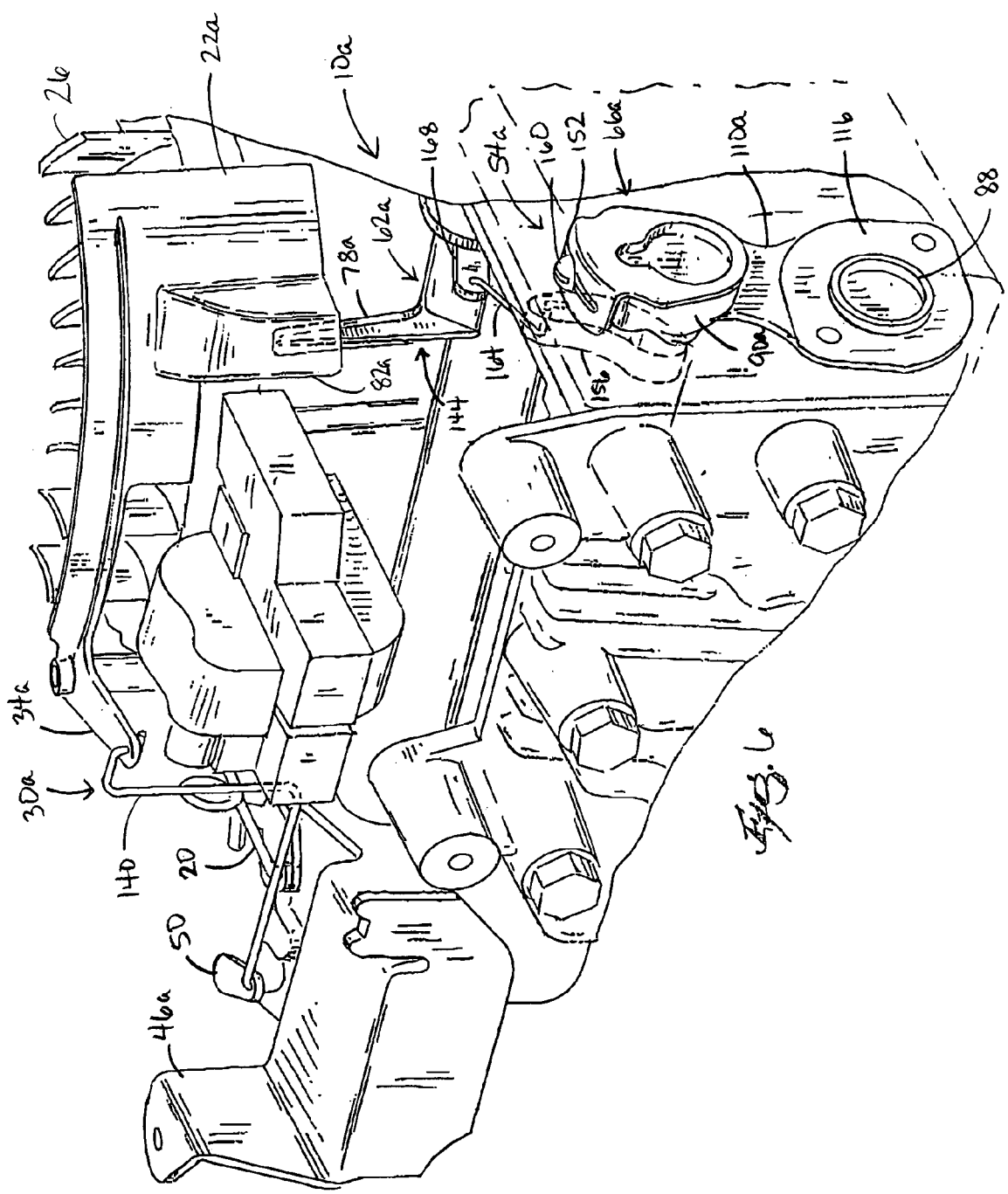
FIG. 6 is a partial perspective view of another embodiment of the internal combustion engine of the present invention.

FIG. 5 illustrates the choke valve assembly 14a according to the present invention. The choke valve assembly 14a includes the choke valve 18. The choke valve 18 in the illustrated embodiment is a butterfly valve that is well known to one of skill in the art. With reference to FIGS. 5 and 6, the choke valve 18 is operable by the air vane 22a via the choke linkage 30a. The choke linkage 30a includes a first arm 34a, a link 140, and the choke lever 50 that is adapted to operate the choke valve 18. A biasing member (not shown) may also be coupled to the link 140 to assist in biasing the choke valve 18 in the closed position. The engine 10a also includes the throttle linkage 20.

FIG. 6 illustrates that the automatic choke apparatus 54a includes a mechanism 62a, and a thermally conductive assembly 66a. The mechanism 62a includes a linkage 74a that includes a stop lever 78a coupled to the thermally conductive assembly 66a via a lever linkage 144, a tab 82a coupled to the air vane 22a, and the choke linkage 30a.

Figure 7:
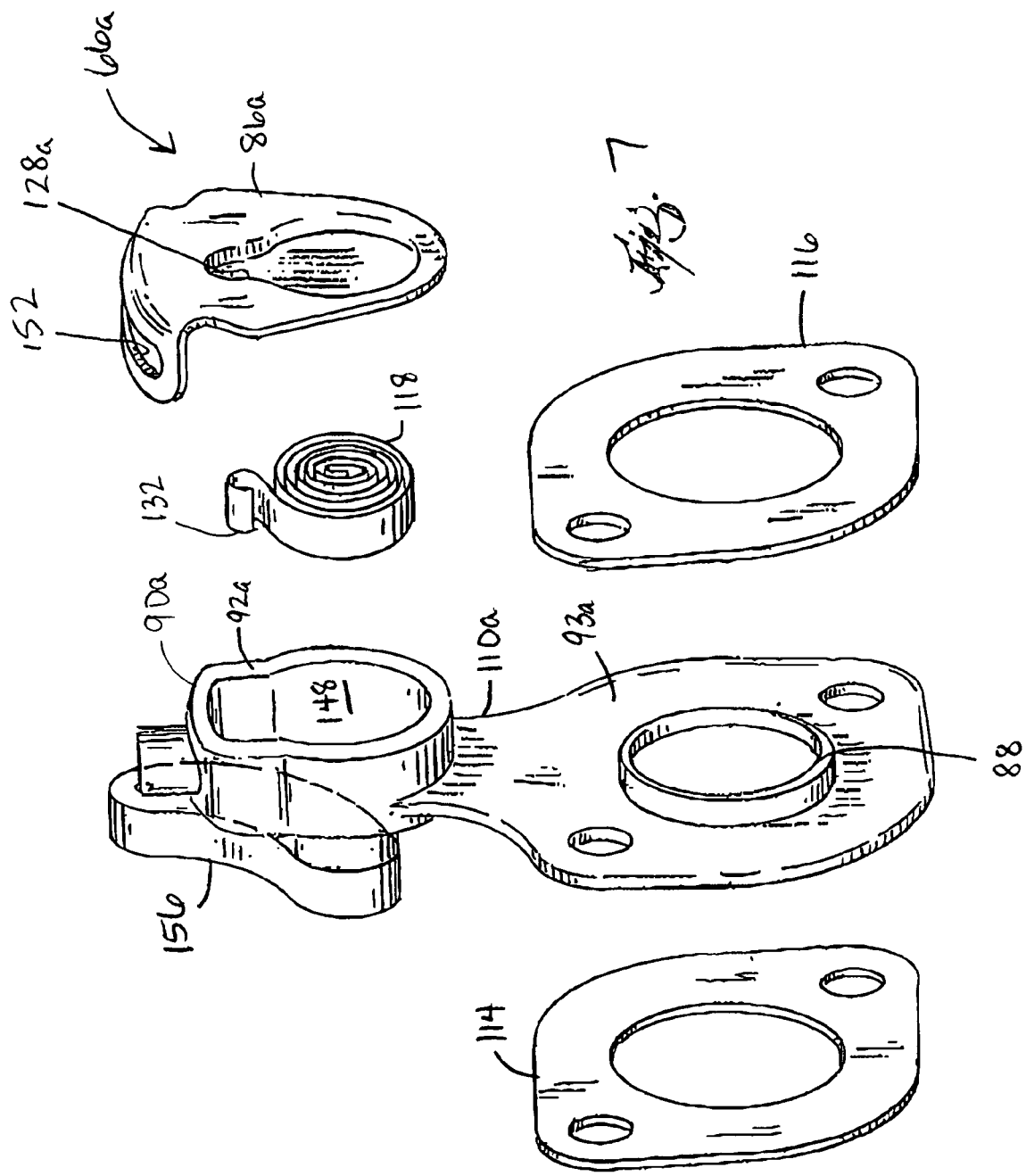
FIG. 7 is an exploded view of a portion of the automatic choke apparatus of the internal combustion engine of FIG. 6.

Referring to FIG. 7, the thermally conductive assembly 66a includes a cover 86a coupled to the conductive element 90a. The conductive element 90a is coupled to the engine 10a and includes a chamber 148 that receives the bimetallic coil 118. The conductive element 90a includes a first aperture 94a that extends rearwardly from the chamber 148. A link arm 156 extends through the first aperture 94a and is coupled to the coil 118. The link arm 156 will be described in greater detail below. A coil aperture 128a in the cover 86a receives the coil tab 132 to secure the coil 118. The cover 86a also includes a link aperture 152 that receives a fastening member 160 (see FIG. 6), such as a screw or a bolt, to attach the cover 86a to the conductive element 90a. The conductive element 90a also includes a bridge 110a to connect the exhaust flange 88.

Figure 8:
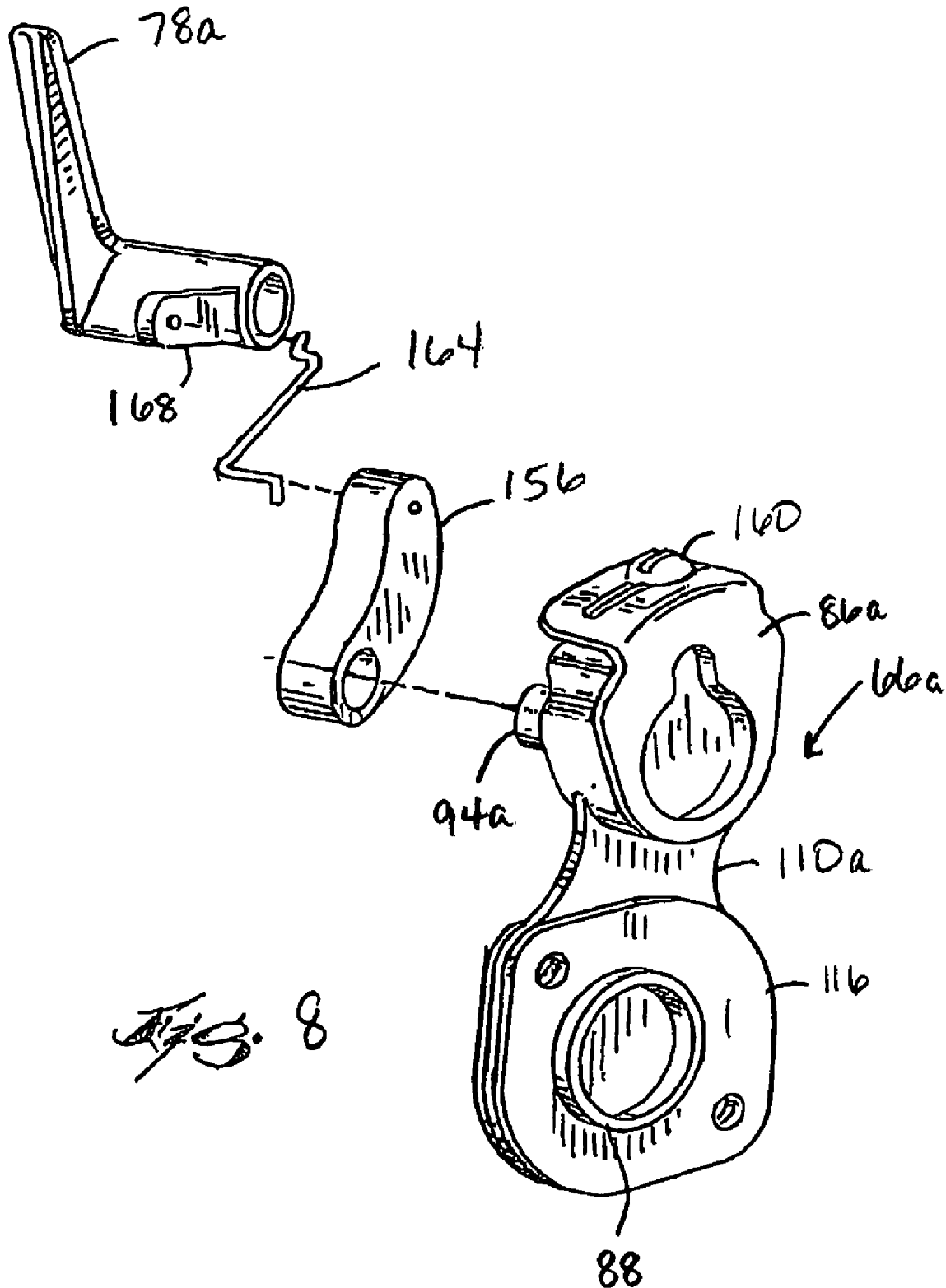
FIG. 8 is a partially exploded view of a portion of the automatic choke apparatus of FIG. 6.

With reference to FIG. 8, the lever linkage 144 includes the link arm 156, which is coupled to the coil 118, a first lever link 164, a second lever link 168, and the stop lever 78a. As the engine 10a heats up, the coil 118 expands or contracts, causing rotation of the link arm 156. The link arm 156, through the interaction of the first and second lever links 164, 168, actuates the stop lever 78a to interact with the tab 82a of the air vane 22a, holding the air vane 22a away from the fan 26. This interaction between the tab 82a and the stop lever 78a actuates the choke linkage 30a and opens the choke valve 18. If the engine 10a is started when the coil 118 senses that the predetermined temperature has been reached, the mechanism 62a will prevent the choke valve 18 from closing.

FIGS. 9–12 illustrate another embodiment of the automatic choke apparatus of the present invention. Similar parts have been given the reference numeral "b" when appropriate.

Figure 9:
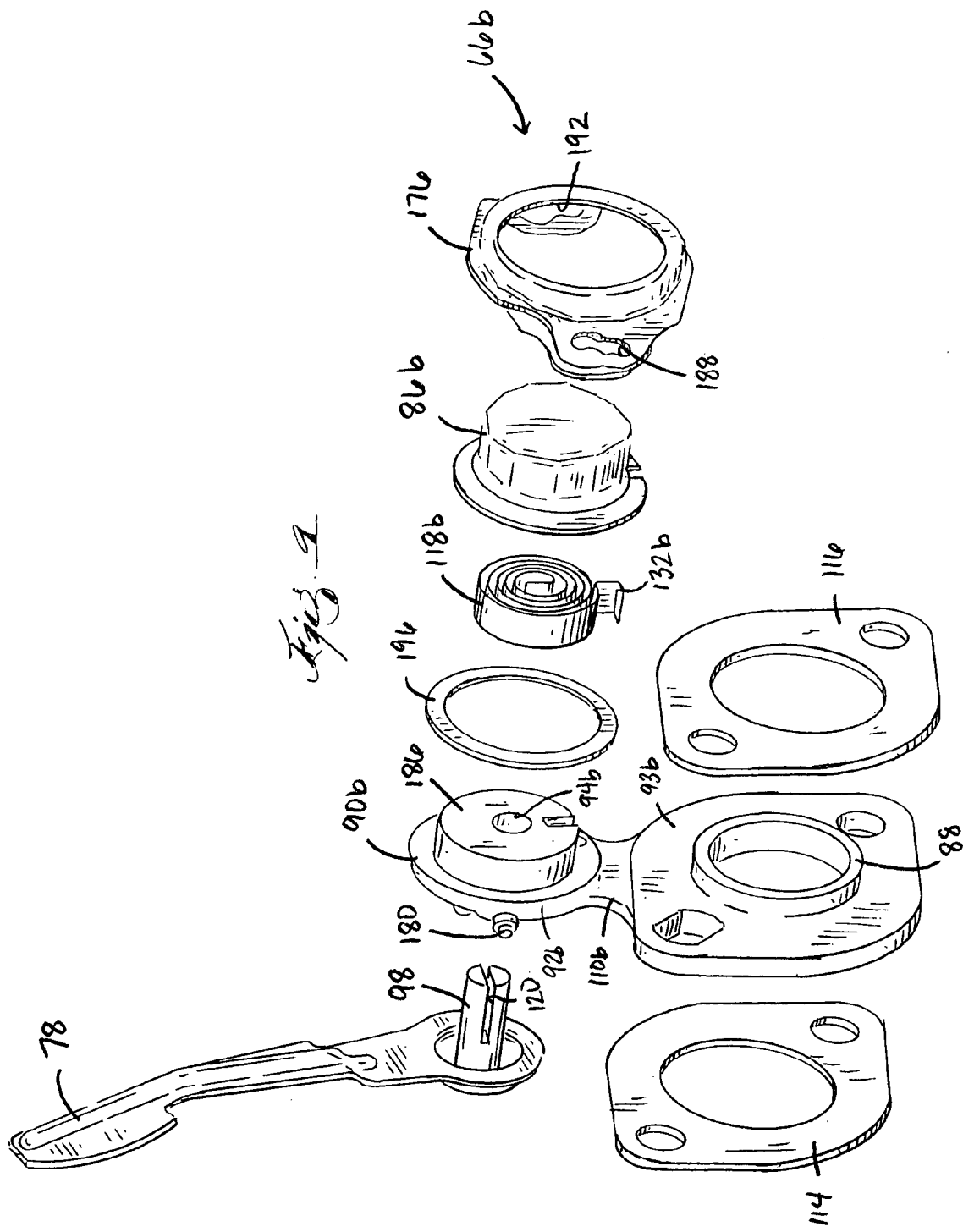
FIG. 9 is an exploded view of a portion of another embodiment of the automatic choke apparatus of the present invention.
Figure 10:
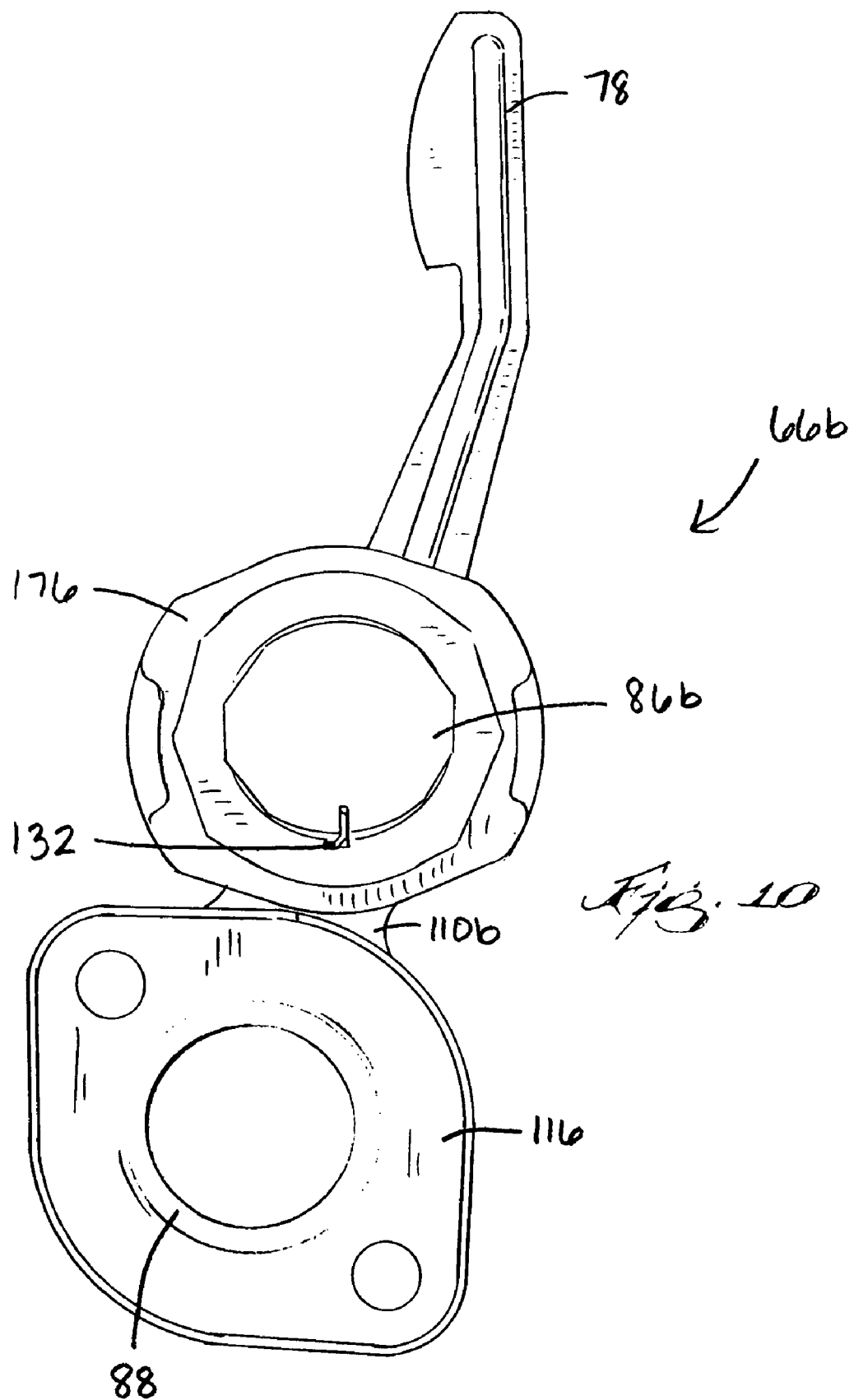
FIG. 10 is a front view of the automatic choke apparatus of FIG. 9.
Figure 11:
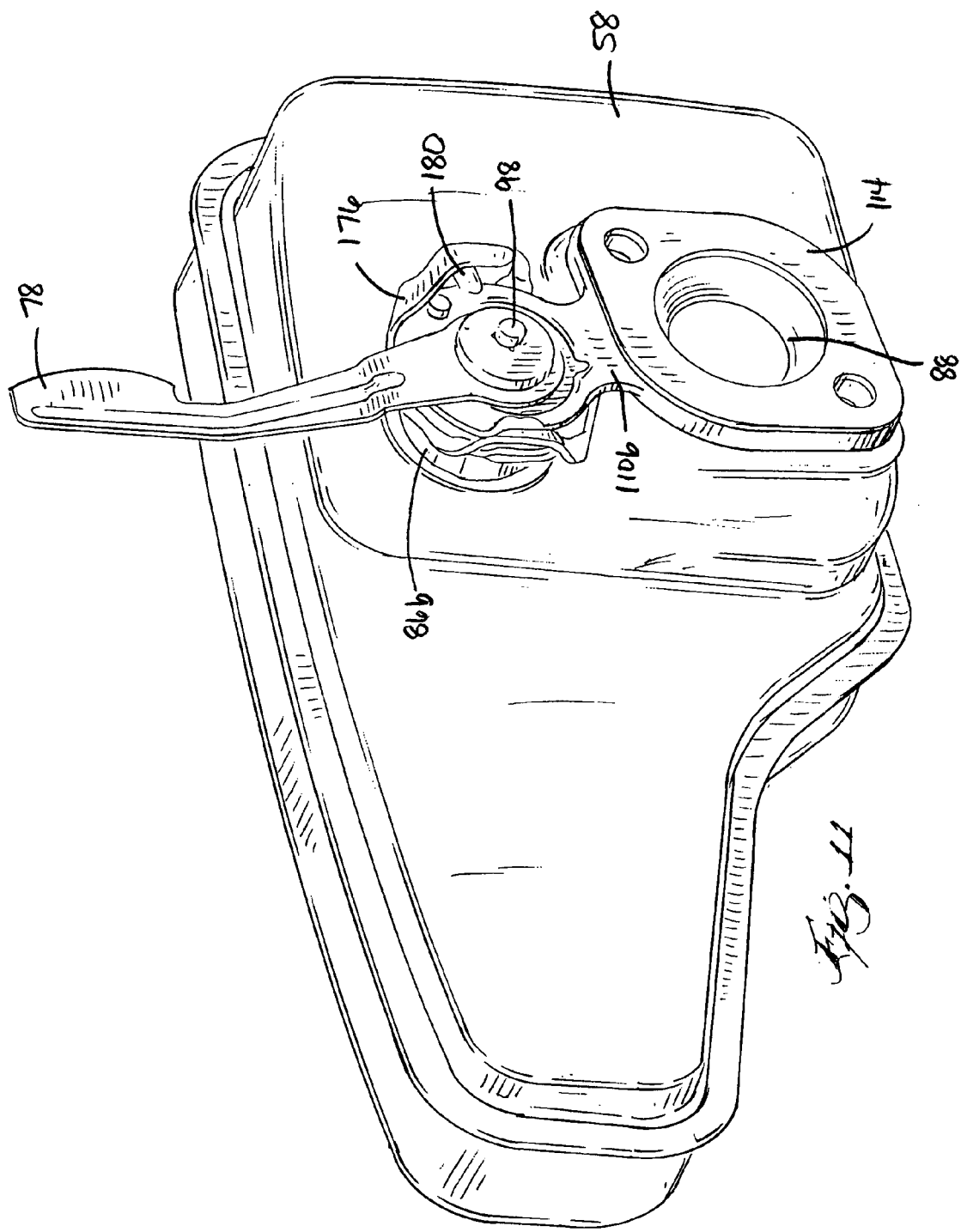
FIG. 11 is a rear view of the automatic choke apparatus of FIG. 9 coupled to an engine muffler for use with an internal combustion engine.

Referring to FIGS. 9–11, the automatic choke apparatus 54b includes the mechanism 62 described above with respect to FIGS. 1–4, and a thermally conductive assembly 66b. The automatic choke apparatus 54b is operable with the air vane 22 described above with respect to FIG. 1. The thermally conductive assembly 66b includes a thermally conductive cover 86b located adjacent the muffler 58 of the engine. As discussed above with respect to FIGS. 2 and 3, the size, geometry, and material of the conductive cover 86b are chosen to optimize heat transfer through the cover 86b. With reference to FIG. 10, the cover 86b includes an aperture to receive the coil tab 132b. Coupled to the cover 86b adjacent the muffler 58 is a retaining ring 176.

The thermally conductive assembly 66b further includes a conductive element 90b that is coupled to the engine housing. The conductive element 90b includes a first aperture 94b that is configured to receive the mounting pin 98 coupled to the stop lever 78. The conductive element 90b also includes a first side projection 180, a second side projection 184 (best seen in FIG. 11) and a first forward projection 186. First and second retainer apertures 188, 192 are configured to receive the side projections 180, 184 when the elements of the thermally conductive assembly 66b are coupled together. The first forward projection 186 is configured to fit within the conductive cover 86b. The thermally conductive assembly 66b also includes a wave washer 196 that fits between the conductive element 90b and the cover 86b to provide a tight fit between the cover 86b and the conductive element 90b. The bimetallic coil 118b is coupled to the conductive element 90b within the cover 86b.

Figure 12:
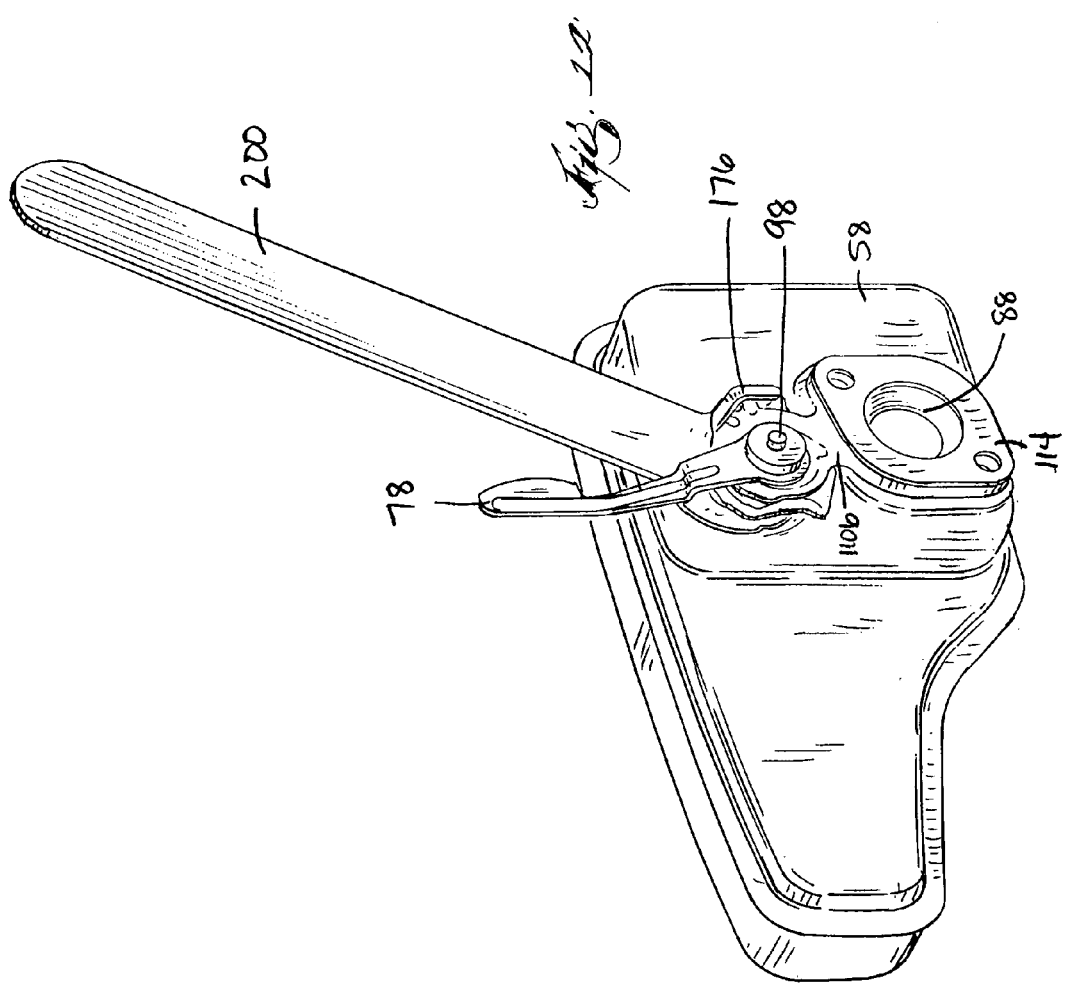
FIG. 12 is the automatic choke apparatus of FIG. 11, illustrating an adjustment mechanism for the automatic choke apparatus.

As shown in FIG. 12, the position of the cover 86b can be easily adjusted using an adjustment member, such as a thin blade wrench 200, to vary the air gap between the stop lever 78 and the tab 82 coupled to the air vane 22. This allows for easy adjustment of the thermally conductive assembly 66b as the engine is assembled. By adjusting the cover 86b, the coil 118b is also adjusted through the interaction of the coil tab 132b with the cover 86b.

FIGS. 14–21 illustrate the automatic choke apparatus 54b described above with respect to FIGS. 9–12, operable with another air vane 22b according to the invention. FIGS. 14–17, 20, and 21 illustrate the engine 10b including a choke valve assembly 14b and the thermally conductive assembly 66b described above.

Figure 21:
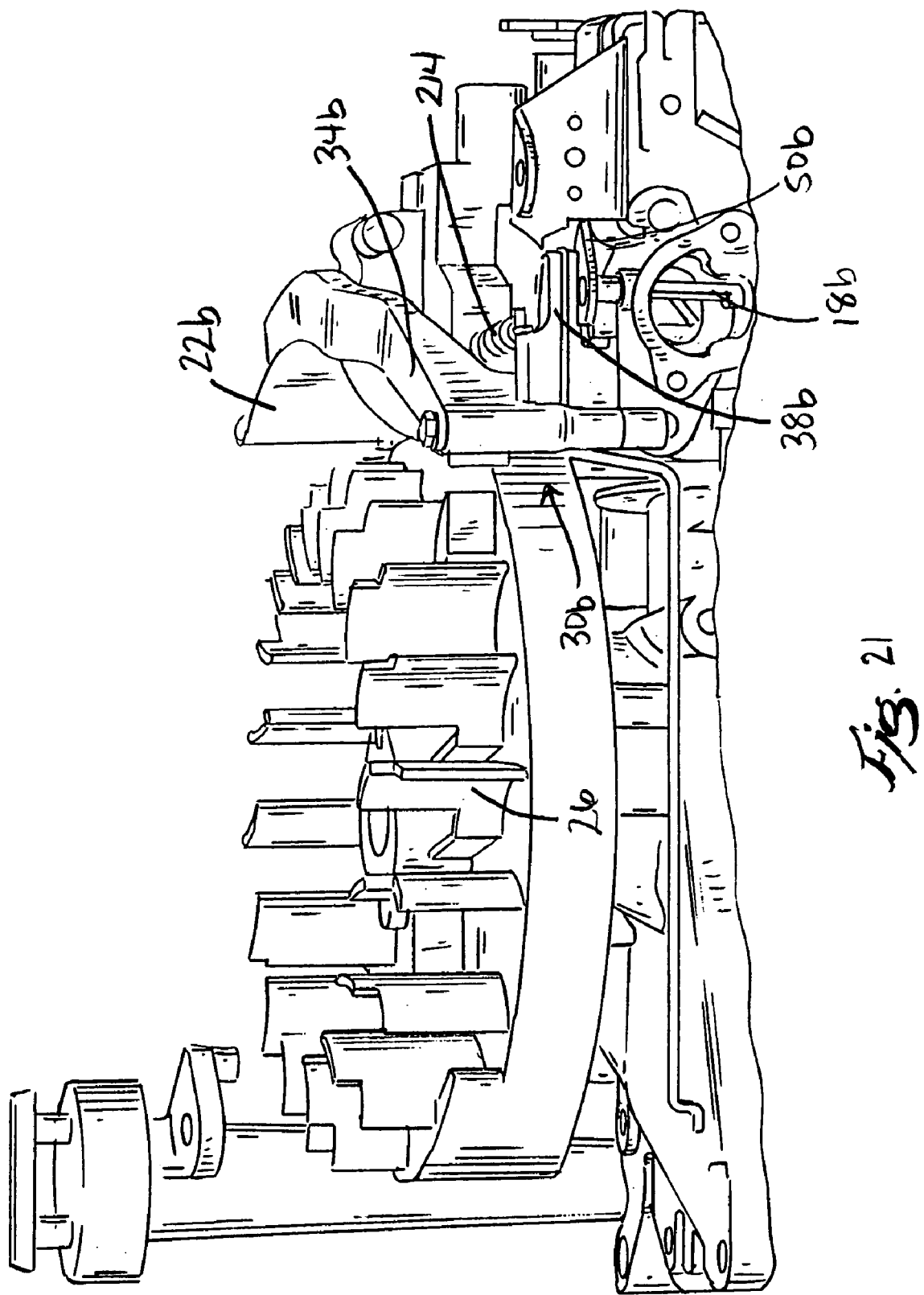
FIG. 21 is a side view of the internal combustion engine of FIG. 20 showing the choke valve in the open position.

The choke valve assembly 14b includes an offset choke valve 18b, best shown in FIGS. 17, 20, and 21. Upon engine starting, the offset choke valve 18b moves momentarily before the air vane 22b moves, providing initial opening torque to the air vane 22b. FIGS. 14–17 illustrate the engine with the choke valve assembly 14b in the closed position, and FIGS. 20 and 21 illustrate the choke valve assembly 14b in the open position.

With reference to FIGS. 16, 18, and 19, the engine 10b includes a choke operating assembly 222. The choke operating assembly 222 includes the air vane 22b and the choke linkage 30b. The choke linkage 30b having a first choke arm 34b and a second choke arm 38b. The choke operating assembly 222 is connected to the choke valve 18 via a choke lever 50b. In the illustrated embodiment, the air vane 22b, the first choke arm 34b, and the second choke arm 38b are integrally formed as a unitary body, such as by injection molding.

As best shown in FIG. 19, the second choke arm 38b includes a hook-like protrusion 210 that is coupled to a biasing member that biases the choke valve 18 in the closed position. In the illustrated embodiment, the biasing member is a spring 214, but it is understood that in other embodiments the biasing member could be any appropriate structure that acts to bias the choke valve 18 in the closed position. The air vane 22b also includes a tab 82b that can be engaged by the stop lever 78 of the mechanism 62.

FIGS. 20 and 21 illustrate the choke valve assembly 14 in the open position. Similar to the operation described above with respect to FIGS. 1–4, heat from the exhaust gases is conducted by the thermally conductive assembly 66b and transmitted to the coil 118b through thermal contact with the coil. The contraction or expansion of the coil 118b results in rotation of the stop lever 78. The stop lever 78 then interacts with the tab 82b to hold the air vane 22b away from the fan 26. This interaction overcomes the biasing force of the spring 214 to cause the choke lever 50b to rotate, opening the choke valve 18. With the choke valve 18 open, more air enters the combustion chamber such that the engine will not stumble or stall due to an overly rich fuel-air mixture.

FIGS. 22–24 illustrate another embodiment of the automatic choke apparatus of the present invention. Similar parts have been given reference numeral "c" when appropriate.

FIGS. 22 and 23 illustrate a thermally conductive assembly 66c for use in an automatic choke apparatus 54c. The automatic choke apparatus 54c includes a mechanism 62c substantially similar to the mechanism 62 described above with respect to FIGS. 1–4. The mechanism 62c includes a linkage that includes a stop lever 78c coupled to the thermally conductive assembly 66c, a tab 82c coupled to the air vane 22c, and a choke linkage 30c (see FIG. 24). As illustrated in FIGS. 22 and 23, the stop lever 78c includes a rigid portion 228, an aperture 230, and an L-shaped member 234. The L-shaped member 234 is movable with respect to the rigid portion 228 such that the thermally conductive assembly 66c is adjustable by moving the L-shaped member 234 over the rigid portion 228 (as shown in shadow in FIG. 22), thereby making the aperture 230 larger or smaller, depending on the direction of motion. Adjusting the stop lever 78c in this way varies the air gap between the stop lever 78c and the tab 82c coupled to the air vane 22c. This configuration of the stop lever 78c further simplifies the adjustment of the thermally conductive assembly 66c.

The thermally conductive assembly 66c includes a cover 86c coupled to the conductive element 90c. A thermally responsive member, such as the bimetallic coil 118 described above, is housed between the cover 86c and the conductive element 90c. As illustrated in FIGS. 22 and 23, the cover 86c includes two tabs 238 (only one is illustrated) that cooperate with a first portion 92c of the conductive element 90c to couple the cover 86c to the conductive element 90c. The first portion 92c of the conductive element 90c includes two apertures 242 (only one shown) for receiving the tabs 238. As best shown in FIG. 23, the cover 86c is secured to the conductive element 90c by bending the tabs 238 over the first portion 92c of the conductive element. Thus, the cover 86c is secured to the conductive element 90c without using a separate fastener.

FIG. 24 illustrates the air vane 22c for use with the thermally conductive assembly 66c. The air vane 22c is similar to the air vane 22b discussed above with respect to FIGS. 16, 18, and 19, with the addition of a rib 246 to strengthen the first choke arm 34c, and a baffle 250 extending outwardly from the first choke arm 34c. The baffle 250 helps block air from flowing out of the engine to improve the cooling of the engine.

Various features of the invention are set forth in the following claims.

We claim:

1. An internal combustion engine, comprising:
   a choke valve;
   a choke operating device that operates the choke valve;
   a thermally conductive assembly in direct contact with exhaust gases produced by the engine;
   a thermally responsive member in thermal communication with the thermally conductive assembly such that the thermally conductive assembly transfers heat from the exhaust gases to the thermally responsive member; and
   a mechanism that moves in response to the thermally responsive member to cause the choke valve to remain in at least a partially open position during engine starting when the thermally responsive member senses a temperature above a predetermined temperature.

2. The engine of claim 1, wherein the choke operating device includes an air vane that moves as a function of engine speed.

3. The engine of claim 2, wherein the engine includes a fan, and wherein the air vane moves in response to air flow produced by the fan.

4. The engine of claim 1, wherein the choke valve is interconnected to the choke operating device via a choke linkage, the choke linkage including a choke lever.

5. The engine of claim 4, wherein the choke linkage includes a biasing member, and wherein the choke valve is biased closed by the biasing member.

6. The engine of claim 4, wherein the choke linkage includes a first choke arm and a second choke arm, and wherein the choke operating device, the first choke arm, and the second choke arm are an integrally-formed unitary body that directly acts on the choke valve.

7. The engine of claim 6, wherein the choke valve is biased closed by a biasing member, and wherein the second choke arm includes a protrusion, such that the biasing member is coupled to the protrusion.

8. The engine of claim 1, wherein the thermally conductive assembly further comprises a thermally conductive element.

9. The engine of claim 8, wherein the thermally conductive element includes a chamber, and wherein the thermally responsive member is disposed in the chamber.

10. The engine of claim 8, wherein the thermally conductive element includes a first portion, a second portion, and a bridge.

11. The engine of claim 10, wherein each of the first portion, second portion, and bridge has a width, and wherein the width of the bridge is more narrow than the width of either the first or second portions.

12. The engine of claim 10, wherein the thermally responsive member is coupled to the first portion of the thermally conductive member.

13. The engine of claim 1, wherein the thermally conductive assembly includes a cover.

14. The engine of claim 13, wherein the cover is coupled in mechanical contact with the thermally responsive member.

15. The engine of claim 1, wherein the thermally responsive member has at least one of a high coefficient of thermal expansion and of thermal contraction such that the thermally responsive member either expands or contracts in response to temperature changes.

16. The engine of claim 15, wherein the thermally responsive member includes a bimetallic coil.

17. The engine of claim 16, wherein the bimetallic coil has a radial configuration.

18. The engine of claim 1, wherein the thermally conductive assembly is disposed adjacent to an engine exhaust system.

19. The engine of claim 18, wherein the thermally conductive assembly is disposed adjacent to an engine muffler.

20. The engine of claim 1, wherein the thermally conductive assembly at least partially surrounds the path of the exhaust gases.

21. The engine of claim 1, wherein the specific geometry of the thermally conductive assembly is chosen to control the heat transfer to the thermally responsive member.

22. The engine of claim 1, wherein the mechanism includes a stop lever coupled to the thermally responsive member such that when the thermally responsive member senses a temperature above the predetermined temperature, the stop lever interacts with the choke operating device, and the choke operating device interacts with a choke lever to hold the choke valve at least partially open during starting of the engine.

23. The engine of claim 1, wherein the mechanism includes a linkage, and wherein the linkage includes a stop lever, a tab coupled to the choke operating device that interacts with the stop lever, a choke linkage coupled to the choke operating device including a choke lever, the choke lever adapted to operate the choke valve.

24. The engine of claim 1, further comprising a lever linkage coupled to the thermally conductive assembly, and wherein the lever linkage includes a link arm, a first lever link, and a second lever link.

25. An automatic choke apparatus coupled to an internal combustion engine, the automatic choke apparatus comprising:
   a choke valve;
   a thermally conductive assembly in direct contact with exhaust gases produced by the engine;
   a thermally responsive member in thermal communication with the thermally conductive assembly such that the thermally conductive assembly transfers heat from the exhaust gases to the thermally responsive member; and a mechanism that moves in response to the thermally responsive member to cause the choke valve to remain in at least a partially open position during engine starting when the thermally responsive member senses a temperature above a predetermined temperature.

26. The automatic choke apparatus of claim 25, wherein the choke valve is operated by a choke operating device via a choke linkage, the choke linkage including a choke lever.

27. The automatic choke apparatus of claim 26, wherein the choke linkage includes a first choke arm and a second choke arm.

28. The automatic choke apparatus of claim 26, wherein the choke operating device includes an air vane.

29. The automatic choke apparatus of claim 28, wherein the choke operating device, the first choke arm, and the second choke arm are integrally-formed as a unitary body.

30. The automatic choke apparatus of claim 25, wherein the mechanism includes a stop lever coupled to the thermally responsive member such that when the thermally responsive member senses a temperature above the predetermined temperature, the stop lever interacts with the choke operating device to hold the choke valve at least partially open during starting of the engine.

31. The automatic choke apparatus of claim 25, wherein the thermally conductive assembly further comprises a thermally conductive element.

32. The automatic choke apparatus of claim 31, wherein the thermally conductive element includes a chamber and wherein the thermally responsive member is disposed in the chamber.

33. The automatic choke apparatus of claim 31, wherein the thermally conductive element includes a first portion, a second portion, and a bridge.

34. The automatic choke apparatus of claim 33, wherein the second portion includes a flange, and wherein the flange adapted to cooperate with at least a portion of the engine.

35. The automatic choke apparatus of claim 31, wherein the thermally conductive assembly includes a cover.

36. The automatic choke apparatus of claim 35, wherein the cover is coupled to the thermally conductive element in mechanical contact with the thermally responsive member.

37. The automatic choke apparatus of claim 25, wherein the thermally responsive member has at least one of a high coefficient of thermal expansion and of thermal contraction such that the thermally responsive member either expands or contracts in response to temperature changes.

38. The automatic choke apparatus of claim 37, wherein the thermally responsive member includes a bimetallic coil.

39. The automatic choke apparatus of claim 25, wherein the thermally conductive assembly is disposed adjacent to an engine exhaust system.

40. The automatic choke apparatus of claim 39, wherein the thermally conductive assembly is disposed adjacent to an engine muffler.

41. The automatic choke apparatus of claim 25, wherein the thermally conductive assembly at least partially surrounds the path of the exhaust gases.

42. The automatic choke apparatus of claim 25, wherein the mechanism includes a linkage, and wherein the linkage includes a stop lever, a choke operating device that engages the stop lever, a choke linkage coupled to the choke operating device, and a choke lever coupled to the choke linkage, the choke lever adapted to operate the choke valve.

43. The automatic choke apparatus of claim 25, further comprising a lever linkage coupled to the thermally conductive assembly, and wherein the lever linkage includes a link arm, a first lever link, and a second lever link.

44. A method of operating a choke in an internal combustion engine using exhaust heat, the internal combustion engine having a choke valve operable by a choke operating device in response to the speed of the engine, the method comprising:
  placing a thermally conductive assembly in direct contact with exhaust gases produced by the engine;
  transmitting heat from the exhaust gases to the thermally conductive assembly through a solid material;
  transmitting heat from the thermally conductive assembly to a thermally responsive member in thermal contact with the thermally conductive assembly;
  providing a linkage between the thermally responsive member and the choke operating device; and
  preventing the choke valve from closing completely during restarts of the engine when the thermally responsive member senses that the temperature of the engine has reached a predetermined temperature.

45. The method of claim 44, further comprising placing the thermally conductive assembly adjacent to an engine exhaust system.

46. The method of claim 45, wherein placing the thermally conductive assembly adjacent to an engine exhaust system includes placing the thermally conductive assembly adjacent to an engine muffler.

47. The method of claim 44, further comprising placing the thermally conductive assembly at least partially surrounding the path of the exhaust gases.

48. The method of claim 44, wherein the preventing step includes providing a mechanism that restricts movement of the choke operating device.

49. The method of claim 44, wherein transmitting the heat to the thermally responsive member causes expansion or contraction of the thermally responsive member, and wherein the expansion or contraction of the thermally responsive member retains the choke valve in an at least partially open position once the engine reaches the predetermined temperature.

* * * * *